United States Patent
Fei et al.

(10) Patent No.: US 11,373,353 B1
(45) Date of Patent: Jun. 28, 2022

(54) HEURISTIC SCHEME IN MATERIAL POINT METHOD FOR SIMULATING MATERIAL

(71) Applicant: Tencent America LLC, Palo Alto, CA (US)

(72) Inventors: Yun Fei, Los Angeles, CA (US); Ming Gao, Los Angeles, CA (US); Qi Guo, Los Angeles, CA (US); Rundong Wu, Mountain View, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/187,014

(22) Filed: Feb. 26, 2021

(51) Int. Cl.
*G06T 13/00* (2011.01)

(52) U.S. Cl.
CPC ................................. *G06T 13/00* (2013.01)

(58) Field of Classification Search
CPC .......... G06F 30/20; G06F 30/25; G06F 30/28; G06F 2113/08; G06T 2210/56; G06T 2210/21; G06T 2210/24; G06T 13/20; G06T 13/60
See application file for complete search history.

(56) References Cited

U.S. PATENT DOCUMENTS

| | | | |
|---|---|---|---|
| 2013/0187930 A1 | 7/2013 | Millman | |
| 2015/0186565 A1 | 7/2015 | Stomakhin et al. | |
| 2015/0187116 A1* | 7/2015 | Stomakhin | G06T 13/60 345/419 |
| 2015/0227651 A1* | 8/2015 | Gowaikar | G06F 30/20 703/2 |
| 2016/0210384 A1* | 7/2016 | Stomakhin | G06F 30/20 |

OTHER PUBLICATIONS

Tampubolon et al., "Multi-species simulation of porous sand and water mixtures," ACM Transactions on Graphics, vol. 36, No. 4, Article 105, Jul. 2017, 11 pgs.
Brackbill et al., "FLIP: A Method for Adaptively Zoned, Particle-in-Cell Calculations of Fluid Flows in Two Dimensions," Journal of Computational Physics, Los Alamos National Laboratory, Oct. 23, 1985, Los Alamos, NM, 30 pgs.

(Continued)

*Primary Examiner* — Hau H Nguyen
(74) *Attorney, Agent, or Firm* — Crowell & Moring LLP

(57) ABSTRACT

Methods, apparatus, and computer readable storage medium for simulating and rendering a material with a modified material point method are described. The method includes, for each of a plurality of time-steps of simulating a material: transferring states of particles representing the material at a N-th time-step to a grid, determining a plurality of grid-node velocities at the N-th time-step using a particle-to-grid computation based on the states of the particles at the N-th time-step, updating the plurality of grid-node velocities at a (N+1)-th time-step based on grid forces, and updating the states of the particles at the (N+1)-th time-step using a grid-to-particle computation based on the states of the particles at the N-th time-step, the plurality of grid-node velocities at the N-th and (N+1)-th time-steps. The method further includes rendering one or more image depicting the material based on the states of the particles at the plurality of time-steps.

17 Claims, 23 Drawing Sheets

(56) References Cited

OTHER PUBLICATIONS

Evans et al., "The Particle-in-Cell Method for Hydrodynamic Calculations," LA-2139, Physics and Mathematics, Los Alamos Scientific Laboratory, Los Alamos, NM, Jun. 1957, 75 pgs.
Jiang et al., "The Affine Particle-in-Cell Method," ACM Transactions on Graphics, vol. 34, No. 4, Article 51, University of California Los Angeles, Aug. 2015, 10 pgs.
J.C. Simo, "A framework for finite strain elastoplasticity based on maximum plastic dissipation and the multiplicative decomposition: Part I. Continuum Formulation," Computer Methods in Applied Mechanics and Engineering 66 (1988), Applied Mechanics Division, Stanford University, Stanford, CA, 21 pgs.
Stomakhin et al., "A material point method for snow simulation," ACM Transactions on Graphics, vol. 32, No. 4, Article 102, University of California Los Angeles, Jul. 2013, 10 pgs.
Wolper et al., "CD-MPM: Continuum damage material point methods for dynamic fracture animation," ACM Trans. Graph., vol. 38, No. 4, Article 119, Jul. 2019, 15 pgs.
International Search Report and Written Opinion of the International Searching Authority regarding PCT/US21/60387 dated Feb. 8, 2022, 9 pages.

\* cited by examiner

2510

2520

2530

HEURISTIC SCHEME IN MATERIAL POINT METHOD FOR SIMULATING MATERIAL

FIELD OF THE TECHNOLOGY

The present disclosure relates to simulating materials, and in particular, to a heuristic scheme in material point method for simulating materials.

BACKGROUND OF THE DISCLOSURE

There are fast development in the field of computer generated imagery (CGI). Physics-based animation means simulating physically plausible dynamics of 2-dimensional or 3-dimensional objects in the animation. Simulating and/or rendering deformable objects and fluids' physical behaviors are essential topics in computer graphics for gaming and movie production. Among various popular algorithms in physics-based simulation, the material point method (MPM) may be used for digitally reproducing quite a large extent of complex materials and physical phenomena. However, there are various issues/problems associated with the existing simulation methods, particularly for example but not limited to, brittle materials and/or certain dynamics such as snow, sand, melting, viscous fluids, cloth, hair, and fracture. One issue/problem may include that the particle dynamics may suffer from excessive dissipation. Another issue/problem may include that, in the scenarios such as separating strands and/or droplets, the existing methods suffer from discontinuous particle velocities being smoothed during the process. Another issue/problem may include failure to break the position trap, and/or suffering from numerical viscosity. Another issue/problem may include lack of damping to the high-frequency motion, thus producing noisy and/or unstable results.

The present disclosure describes various embodiments for simulating and/or rendering materials with a modified material point method, addressing at least one of the issues/problems discussed above. The present disclosure improves the technical field of computer generated imagery (CGI) with at least one of the following improvement: achieving easier particle separation, reducing the numerical dissipation in MPM, providing higher effectiveness, reducing diffusion and unphysical viscosity, breaking the positional trap, reducing the dissipation among separating particles, and/or generating more energetic dynamics without significant extra computational costs.

SUMMARY

The present disclosure describes various embodiments of methods, apparatus, and computer-readable storage medium for simulating and/or rendering materials with a modified material point method.

According to one aspect, an embodiment of the present disclosure provides a method for simulating and rendering a material with a modified material point method. The method includes, for each of a plurality of time-steps of simulating a material: transferring, by a device, states of particles representing the material at a N-th time-step to a grid, wherein N is an integer, the states of the particles comprise velocities of the particles and positions of the particles, and the grid comprises a plurality of grid-nodes, determining, by the device, a plurality of grid-node velocities at the N-th time-step using a particle-to-grid computation based on the states of the particles at the N-th time-step, updating, by the device, the plurality of grid-node velocities at a (N+1)-th time-step based on grid forces, and updating, by the device, the states of the particles at the (N+1)-th time-step using a grid-to-particle computation based on the states of the particles at the N-th time-step, the plurality of grid-node velocities at the N-th time-step, and the plurality of grid-node velocities at the (N+1)-th time-step, wherein the grid-to-particle computation comprises a velocity grid-to-particle computation and a position grid-to-particle computation. The device includes a memory storing instructions and a processor in communication with the memory. The method further includes rendering, by the device, one or more image depicting the material based on the states of the particles at the plurality of time-steps.

According to another aspect, an embodiment of the present disclosure provides an apparatus for simulating and rendering a material with a modified material point method. The apparatus includes a memory storing instructions; and a processor in communication with the memory. When the processor executes the instructions, the processor is configured to cause the apparatus to, for each of a plurality of time-steps of simulating a material: transfer states of particles representing the material at a N-th time-step to a grid, wherein N is an integer, the states of the particles comprise velocities of the particles and positions of the particles, and the grid comprises a plurality of grid-nodes, determine a plurality of grid-node velocities at the N-th time-step using a particle-to-grid computation based on the states of the particles at the N-th time-step, update the plurality of grid-node velocities at a (N+1)-th time-step based on grid forces, and update the states of the particles at the (N+1)-th time-step using a grid-to-particle computation based on the states of the particles at the N-th time-step, the plurality of grid-node velocities at the N-th time-step, and the plurality of grid-node velocities at the (N+1)-th time-step, wherein the grid-to-particle computation comprises a velocity grid-to-particle computation and a position grid-to-particle computation. When the processor executes the instructions, the processor is configured to further cause the apparatus to render one or more image depicting the material based on the states of the particles at the plurality of time-steps.

In another aspect, an embodiment of the present disclosure provides a non-transitory computer readable storage medium storing instructions. When the instructions are executed by a processor, the instructions cause the processor to, for each of a plurality of time-steps of simulating a material: transfer states of particles representing the material at a N-th time-step to a grid, wherein N is an integer, the states of the particles comprise velocities of the particles and positions of the particles, and the grid comprises a plurality of grid-nodes, determine a plurality of grid-node velocities at the N-th time-step using a particle-to-grid computation based on the states of the particles at the N-th time-step, update the plurality of grid-node velocities at a (N+1)-th time-step based on grid forces, and update the states of the particles at the (N+1)-th time-step using a grid-to-particle computation based on the states of the particles at the N-th time-step, the plurality of grid-node velocities at the N-th time-step, and the plurality of grid-node velocities at the (N+1)-th time-step, wherein the grid-to-particle computation comprises a velocity grid-to-particle computation and a position grid-to-particle computation. When the instructions are executed by a processor, the instructions further cause the processor to render one or more image depicting the material based on the states of the particles at the plurality of time-steps.

The above and other aspects and their implementations are described in greater detail in the drawings, the descriptions, and the claims.

DETAILED DESCRIPTION OF THE DISCLOSURE

Figure 1:
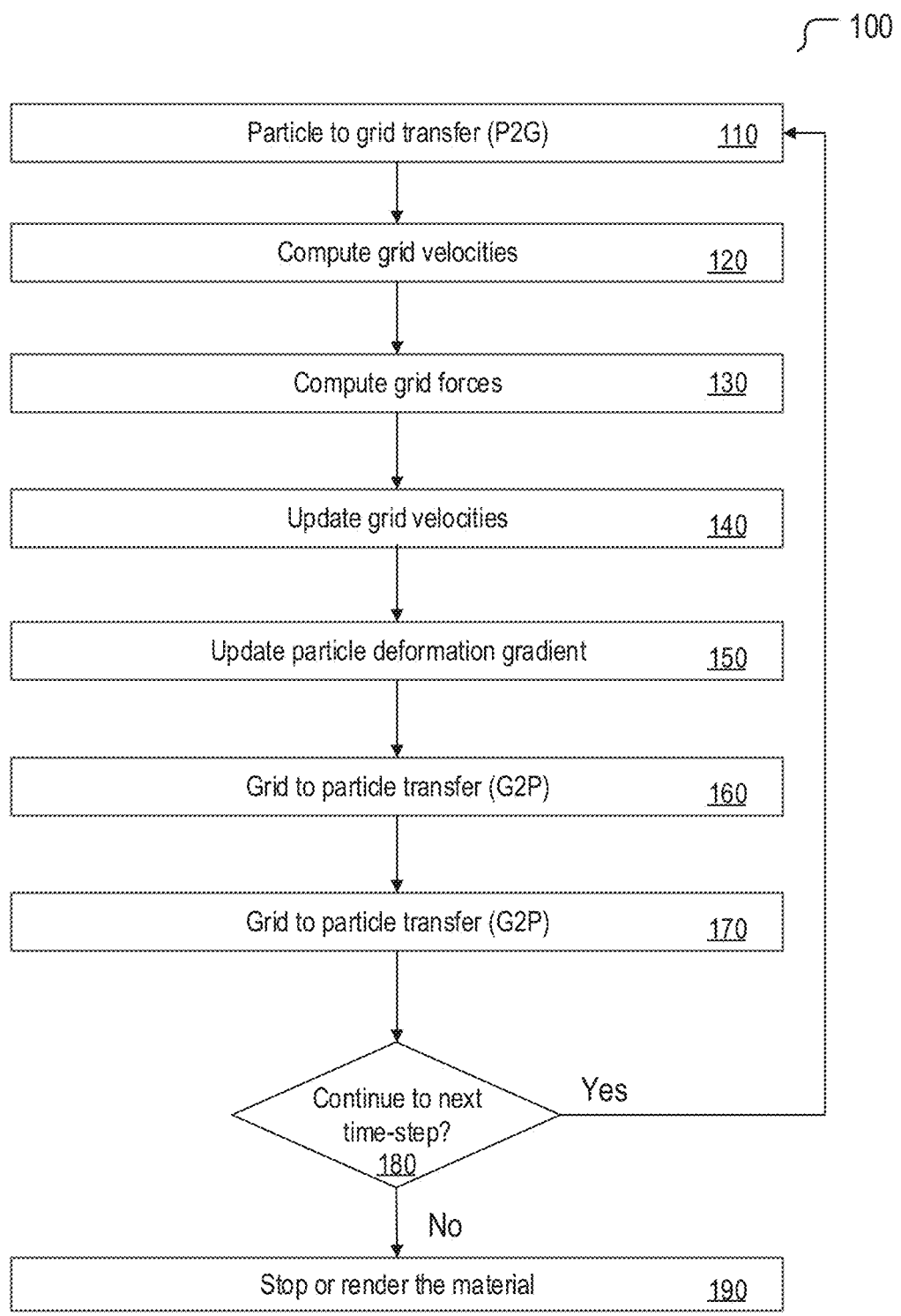
FIG. 1 is a flow diagram of an embodiment disclosed in the present disclosure.

The invention will now be described in detail hereinafter with reference to the accompanied drawings, which form a part of the present invention, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

There are fast development in the field of computer generated imagery (CGI). Physics-based animation means simulating physically plausible dynamics of 2-dimensional or 3-dimensional objects in the animation. Simulating and/or rendering deformable objects and fluids' physical behaviors are essential topics in computer graphics for gaming and/or movie production.

Among various popular algorithms in physics-based simulation, the material point method (MPM) may be used for digitally reproducing quite a large extent of complex materials and physical phenomena. The animation with complex and complicated dynamics is usually generated from the physics-based simulation engine. The material point method (MPM) has recently been shown to be suitable for digitally reproducing massive-scale physical phenomena with many materials and coupling. However, there are various issues/problems associated with the existing simulation methods, particularly for a group of materials and/or under one or more certain condition, for example but not limited to, brittle materials and/or certain dynamics such as snow, sand, melting, viscous fluids, cloth, hair, and fracture.

The present disclosure describes various embodiments for simulating and/or rendering materials with a modified material point method, addressing at least one of the issues/problems discussed above. The present disclosure improves the technical field of computer generated imagery (CGI) with at least one of the following improvement: achieving easier particle separation, reducing the numerical dissipation in MPM, providing higher effectiveness, reducing diffusion and unphysical viscosity, breaking the positional trap, reducing the dissipation among separating particles, and/or generating more energetic dynamics without significant extra computational costs.

As an Eulerian/Lagrangian hybrid method, MPM may manifest more dissipation and numerical viscosity than traditional Lagrangian methods. One important reason for the numerical dissipation in MPM is its integration scheme. Many integrators may be used in MPM, for example but not limited to: particle-in-cell (PIC) method, fluid implicit-particle (FLIP) method, affine particle-in-cell (APIC) method.

The present disclosure describes various embodiments, wherein, to achieve easier particle separation and reduce the numerical dissipation in MPM, a heuristic FLIP (HFLIP) scheme, an affine-augmented FLIP (AFLIP) scheme, and an affine-augmented heuristic FLIP (AHFLIP) scheme may be used as integrators in a MPM, as a modified MPM. These various embodiments improve effectiveness of MPM. Several large-scale simulations show that one or more embodiment excessively reduces diffusion and unphysical viscosity compared to traditional integrators. The present disclosure improves the technical field of computer generated imagery (CGI) with at least one of the following contributions: the heuristic integration scheme in one or more embodiment manages to break the positional trap and applies to both FLIP and APIC to reduce the dissipation among separating particles; and/or the one or more embodiment generates more energetic dynamics with almost zero extra computational costs. The one or more embodiment may save computation power by reducing memory consumption and/or central processing unit/graphics processing unit (CPU/GPU) running time.

The present disclosure describes method using a material point method (MPM) for digitally reproducing quite a large extent of complex materials and physical phenomena on a massive scale, such as snow, sand, melting, viscous fluids, cloth, hair, and fracture. The non-slip contacts may be resolved on the grid naturally without paying extra costs like collision detection or resolution, making MPM an effective discretization method for capturing the dynamics of millions of particles or elements. MPM may be integrated into the workflow by animation studios and visual special effects companies. This technology may be applied in the development and/or production of animation movies.

FIG. 1 shows a flow diagram of a method 100 for preforming MPM. The method 100 may include a portion or all of the following steps: step 110: performing particle to grid transfer (P2G); step 120: computing grid velocities; step 130: computing grid forces; step 140: updating grid velocities; step 150: updating particle deformation gradient; step 160: performing grid to particle transfer (G2P); step 170: performing particle advection; step 180: determining whether to continue to next time-step; step 180: in response to the determination not to continue to next time-step, stopping or rendering the material; and/or in response to the determination to continue to next time-step, beginning next time-step by itinerating steps 110-180.

Figure 2:
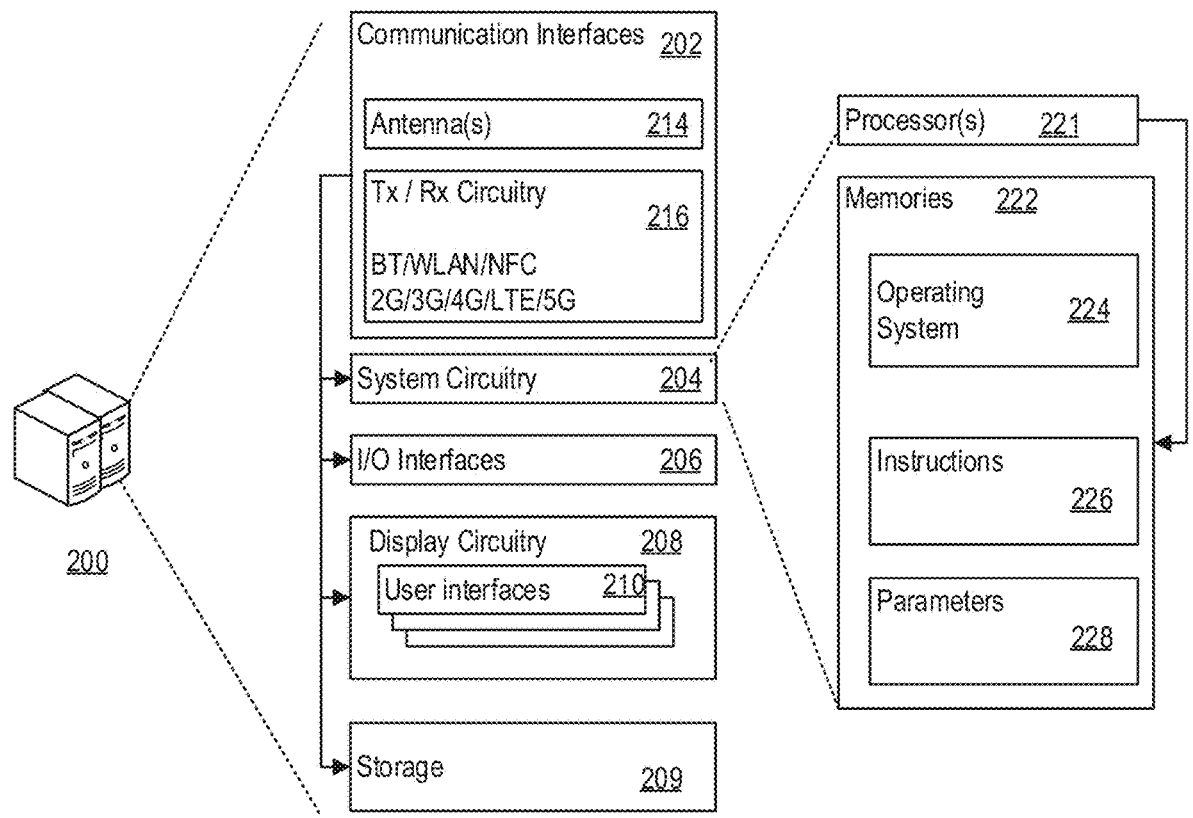
FIG. 2 is a schematic diagram of an electronic device disclosed in the present disclosure.

FIG. 2 shows an example of an electronic device 200 to implement one or more method described in the present disclosure. In one implementation, the electronic device 200 may be at least one of a computer, a server, a laptop, or a mobile device. In another implementation, the electronic device 200 may be a set of electronic devices comprising at least one of one or more computing server, one or more data server, one or more network server, one or more terminal, one or more laptop, and/or one or more mobile device.

The electronic device 200 may include communication interfaces 202, a system circuitry 204, an input/output interfaces (I/O) 206, a display circuitry 208, and a storage 209. The display circuitry may include a user interface 210. The system circuitry 204 may include any combination of hardware, software, firmware, or other logic/circuitry. The system circuitry 204 may be implemented, for example, with one or more systems on a chip (SoC), application specific integrated circuits (ASIC), discrete analog and digital circuits, and other circuitry. The system circuitry 204 may be a part of the implementation of any desired functionality in the electronic device 200. In that regard, the system circuitry 204 may include logic that facilitates, as examples, decoding and playing music and video, e.g., MP3, MP4, MPEG, AVI, FLAG, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 210. The user interface 210 and the inputs/output (I/O) interfaces 206 may include a graphical user interface, touch sensitive display, haptic feedback or other haptic output, voice or facial recognition inputs, buttons, switches, speakers and other user interface elements. Additional examples of the I/O interfaces 206 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 2, the communication interfaces 202 may include wireless transmitters and receivers ("transceivers") and any antennas used by the transmitting and receiving circuitry of the transceivers. The communication interfaces 202 may also include wireline transceivers, which may provide physical layer interfaces for any of a wide range of communication protocols, such as any type of Ethernet, data over cable service interface specification (DOCSIS), digital subscriber line (DSL), Synchronous Optical Network (SONET), or other protocol. The communication interfaces 202 may include a Radio Frequency (RF) transmit (Tx) and receive (Rx) circuitry 216 which handles transmission and reception of signals through one or more antennas 214. The communication interface 202 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 202 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry. For example referring to FIG. 2, the system circuitry 204 may include one or more processors 221 and memories 222. The memory 222 stores, for example, an operating system 224, instructions 226, and parameters 228. The processor 221 is configured to execute the instructions 226 to carry out desired functionality for the electronic device 200. The parameters 228 may provide and specify configuration and operating options for the instructions 226. The memory 222 may also store any BT, WiFi, 3G, 4G, 5G or other data that the electronic device 200 will send, or has received, through the communication interfaces 202. In various implementations, a system power for the electronic device 200 may be supplied by a power storage device, such as a battery or a transformer.

The storage 209 may be used to store various initial, intermediate, or final data. In one implementation, the storage 209 may be integral with a database server. The storage 209 may be centralized or distributed, and may be local or remote to the electronic device 200. For example, the storage 209 may be hosted remotely by a cloud computing service provider.

The present disclosure describes various embodiments, which may be implemented, partly or totally, on the one or more electronic device described in FIG. 2.

Figure 3:
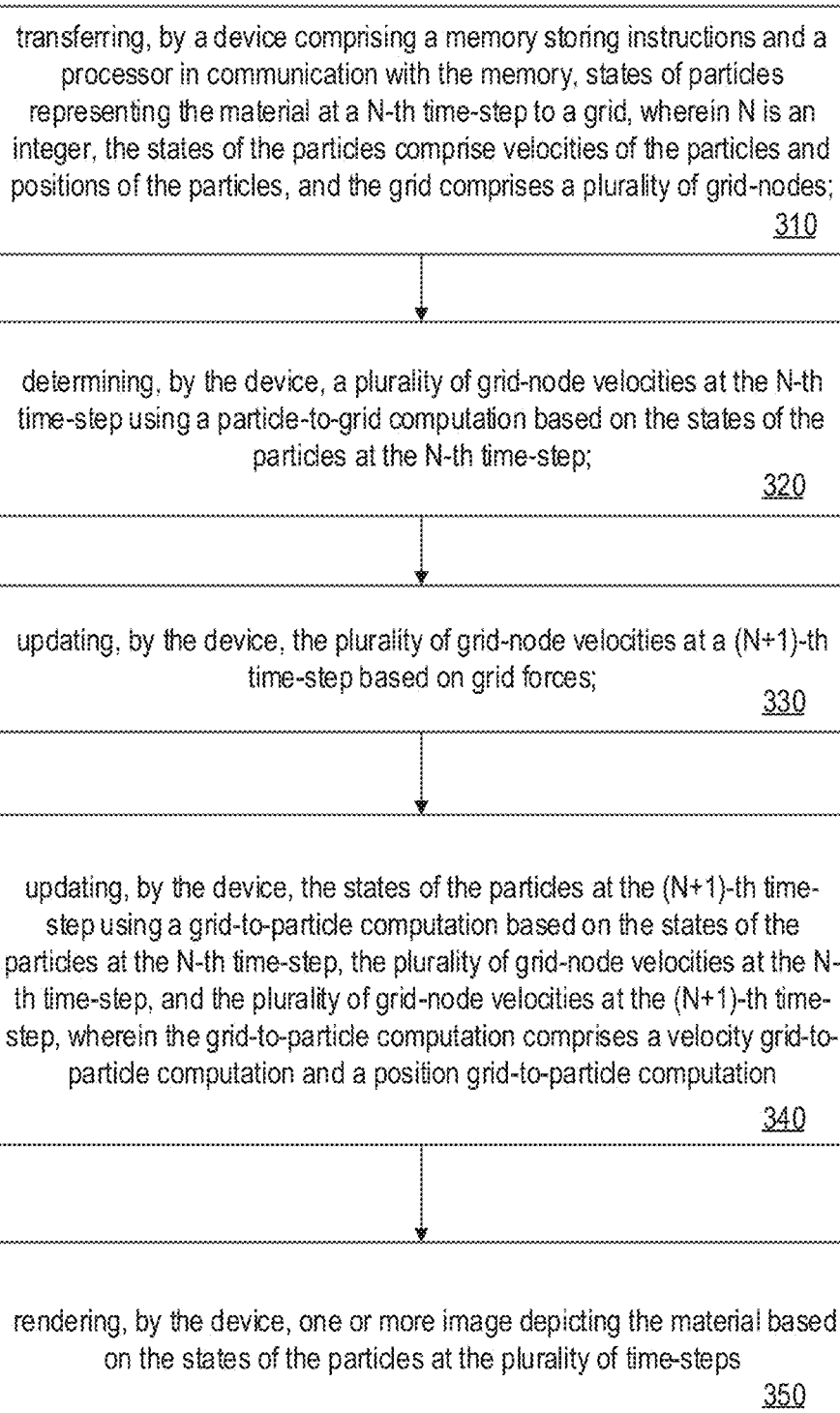
FIG. 3 is a flow diagram of an embodiment disclosed in the present disclosure.

Referring to FIG. 3, the present disclosure describes embodiments of a method 300 for simulating and rendering a material with a modified material point method. The method 300 may include a portion or all of the following steps. For each of a plurality of time-steps of simulating a material: step 310, transferring, by a device comprising a memory storing instructions and a processor in communication with the memory, states of particles representing the material at a N-th time-step to a grid, wherein N is an integer, the states of the particles comprise velocities of the particles and positions of the particles, and the grid comprises a plurality of grid-nodes; step 320, determining, by the device, a plurality of grid-node velocities at the N-th time-step using a particle-to-grid computation based on the states of the particles at the N-th time-step; step 330, updating, by the device, the plurality of grid-node velocities at a (N+1)-th time-step based on grid forces; and step 340, updating, by the device, the states of the particles at the (N+1)-th time-step using a grid-to-particle computation based on the states of the particles at the N-th time-step, the plurality of grid-node velocities at the N-th time-step, and the plurality of grid-node velocities at the (N+1)-th time-step, wherein the grid-to-particle computation comprises a velocity grid-to-particle computation and a position grid-to-particle computation. Step 350, rendering, by the device, one or more image depicting the material based on the states of the particles at the plurality of time-steps.

In one implementation, the velocity grid-to-particle computation comprises a velocity adjustment term; the position grid-to-particle computation comprises a position adjustment term; and/or step 340 may include updating the velocities of the particles at the (N+1)-th time-step using the velocity grid-to-particle computation based on the velocities of the particles at the N-th time-step, the plurality of grid-node velocities at the N-th time-step, and the plurality of grid-node velocities at the (N+1)-th time-step, and/or updating the positions of the particles at the (N+1)-th time-step using the position grid-to-particle computation based on the states of the particles at the N-th time-step, the plurality of grid-node velocities at the N-th time-step, and the plurality of grid-node velocities at the (N+1)-th time-step.

In another implementation, the velocity adjustment term comprises $\alpha(v_p^n - \Sigma_i w_{ip} v_i^n)$; and the position adjustment term comprises $\beta_p \alpha(v_p^n - \Sigma_i w_{ip} v_i^n)$, wherein:

$\alpha$ is a blending parameter comprising a value between 0 and 1, inclusive, $\beta_p$ is a trap-breaking parameter for a p-th particle, p being a non-negative integer, and the trap-breaking parameter includes a value between 0 and 1, inclusive, $v_p^n$ is a velocity at the N-th time-step for a p-th particle, p being a non-negative integer, $v_i^n$ is a velocity at the N-th time-step for a i-th grid-node, i being a non-negative integer, and $w_{ip}$ is a weight parameter for the p-th particle and the i-th grid-node.

In another implementation, the method 300 may further include determining whether a first, a second, or a third heuristic scheme satisfies for a p-th particle based on states of the p-th particle at the N-th time-step. The first heuristic scheme comprises that a particle is at or within a boundary and moves towards the boundary; the second heuristic scheme comprises that a particle is at or within a source; and the third heuristic scheme comprises that a volume ratio for a particle is within a pre-determined volume ratio threshold. The method 300 may further include in response to determining that the first heuristic scheme is satisfied for the p-th particle, setting $\beta_p$ as zero; in response to determining that the second heuristic scheme is satisfied for the p-th particle, setting $\beta_p$ as zero; in response to determining the third heuristic scheme is satisfied for the p-th particle setting $\beta_p$ as a first pre-determined trap-breaking value, wherein the first pre-determined trap-breaking value is between 0 and 1, inclusive; and/or in response to determining the none of the first, the second, and the third heuristic scheme is satisfied for the p-th particle, setting $\beta_p$ as a second pre-determined trap-breaking value, wherein the second pre-determined trap-breaking value is between 0 and 1, inclusive, wherein the second pre-determined trap-breaking value is larger than the first pre-determined trap-breaking value. In one implementation, the first pre-determined trap-breaking value may be a value between 0 and 0.05, inclusive. In another implementation, the second pre-determined trap-breaking value may be a value bigger or the same as the first pre-determined trap-breaking value.

In another implementation, the particle-to-grid computation comprises a velocity gradient term; the velocity grid-to-particle computation comprises a velocity adjustment term; and/or the updating the states of the particles at the (N+1)-th time-step using the grid-to-particle computation based on the states of the particles at the N-th time-step, the plurality of grid-node velocities at the N-th time-step, and the plurality of grid-node velocities at the (N+1)-th time-step may include updating the velocities of the particles at the (N+1)-th time-step using the velocity grid-to-particle computation based on the velocities of the particles at the N-th time-step, the plurality of grid-node velocities at the N-th time-step, and the plurality of grid-node velocities at the (N+1)-th time-step, updating the positions of the particles at the (N+1)-th time-step using the position grid-to-particle computation based on the states of the particles at the N-th time-step and the plurality of grid-node velocities at the (N+1)-th time-step, and/or updating a velocity gradient parameter at the (N+1)-th time-step using a velocity gradient computation based on the states of the particles at the N-th time-step and the plurality of grid-node velocities at the (N+1)-th time-step.

In another implementation, the velocity gradient term comprises $C_p^n(x_i^n - x_p^n)$; the velocity adjustment term comprises $\alpha(v_p^n - \Sigma_i w_{ip} v_i^n)$; and the velocity gradient computation comprises $C_p^{n+1} = \Sigma_i w_{ip} v_i^* (x_i^n - x_p^n)^T (D_p^n)^{-1}$, wherein:

$C_p^n$ and $C_p^{n+1}$ are the velocity gradient parameter at the N-th time-step and the (N+1)-th time-step for a p-th particle, respectively, p being a non-negative integer, $x_i^n$ is a position at the N-th time-step for a i-th grid-node, i being a non-negative integer, $x_p^n$ is a position at the N-th time-step for the p-th particle, $\alpha$ is a blending parameter comprising a value between 0 and 1, inclusive, $v_p^n$ is a velocity at the N-th time-step for the p-th particle, $v_i^n$ is a velocity at the N-th time-step for the i-th grid-node, $v_i^*$ is a velocity at the (N+1)-th time-step for the i-th grid-node, $w_{ip}$ is a weight parameter for the p-th particle and the i-th grid-node, and $D_p^n$ is a B-spline quadratic kernel at the N-th time-step for the p-th particle.

In another implementation, the particle-to-grid computation comprises a velocity gradient term; the velocity grid-to-particle computation comprises a velocity adjustment term; the position grid-to-particle computation comprises a position adjustment term; and/or the step 340 may include updating the velocities of the particles at the (N+1)-th time-step using the velocity grid-to-particle computation based on the velocities of the particles at the N-th time-step, the plurality of grid-node velocities at the N-th time-step, and the plurality of grid-node velocities at the (N+1)-th time-step, updating the positions of the particles at the (N+1)-th time-step using the position grid-to-particle computation based on the states of the particles at the N-th time-step, the plurality of grid-node velocities at the N-th time-step, and the plurality of grid-node velocities at the (N+1)-th time-step, and updating a velocity gradient parameter at the (N+1)-th time-step using a velocity gradient computation based on the states of the particles at the N-th time-step and the plurality of grid-node velocities at the (N+1)-th time-step.

Various embodiments may focus on the at least one step of particle-to-grid transfer (P2G), grid-to-particle transfer (G2P), and/or particle advection in MPM. In the present disclosure, the particle velocities and positions may be denoted as v and x, respectively, and the velocities stored on the i-th node may be denoted as $v_i$. The superscript may be used to denote the index of time-steps, e.g., $v^n$ for the particle velocity at the n-th time-step. The time step size is denoted as $\Delta t$. In the present disclosure, "time-step" may be refer as "time step".

Particle-In-Cell (PIC) Method

In various embodiments, a particle-in-cell (PIC) method may be used. The PIC method may integrate particle velocities and positions through the following steps.

For performing P2G for each particle (located at $x_p^n$), the method may include finding its neighboring nodes (located at 4) on the grid. A node on the grid may be referred as "grid-node" or "node". The method may include transferring its mass and momentum to these nodes through a continuous interpolation function $w(x_i^n, x_p^n)$ (or $w_{ip}$ for abbreviation). Then, for each grid node, the accumulated momentum is divided by the accumulated mass to compute the nodal velocity $v_i^n$. This process may be summarized as $m_i^n v_i^n = \Sigma_p w_{ip} m_p v_p^n$.

The method may optionally further include, on the grid, calculating forces on nodes by integrating the stress over the neighboring particles, updating the nodal velocities, and then resolving the collision with boundaries to obtain $v_i^*$.

For performing G2P transfer, the method may include transferring the nodal velocities $v_i^*$ back to particles through an interpolation function and update the particle positions. This process may be summarized as $v_p^{n+1} = \Sigma_i w_{ip} v_i^*$, and/or $x_p^{n+1} = x_p^n + \Delta t \Sigma_i w_{ip} v_i^*$.

The particle-grid transfers of PIC may be summarized as:

PIC P2G: $m_i^n v_i^n = \Sigma_p w_{ip} m_p v_p^n$

PIC G2P: $v_p^{n+1} = \Sigma_i w_{ip} v_i^*$, and $x_p^{n+1} = x_p^n + \Delta t \Sigma_i w_{ip} v_i$ Affine Particle-In-Cell (APIC) Method In various embodiments, an affine particle-in-cell (APIC) method may be used. This method may be adopted as an extension to PIC. APIC stores an extra momentum matrix Cn for keeping track of the approximation to local velocity gradient.

In G2P, PIC and APIC may share the same update rule of particle velocities and positions, and/or APIC may also need to update Cn.

In P2G, the matrix is used to compensate the particle's affine motion with respect to each neighboring node.

The two transfer steps of APIC may be summarized as the following:

APIC P2G: $m_i^n v_i^n = \Sigma_p w_{ip} m_p (v_p^n + C_p^n (x_i^n - x_p^n))$

APIC G2P: $v_p^{n+1} = \Sigma_i w_{ip} v_i^*$ $x_p^{n+1} = x_p^n + \Delta_t \Sigma_i w_{ip} v_i^*$ $C_p^{n+1} = \Sigma_i w_{ip} v_i^* (x_i^n - x_p^n)^T (D_p^n)^{-1}$ Wherein $$D_p^n = \frac{1}{4} \Delta x^2 I$$

is for B-spline quadratic kernel. APIC may produce more energetic simulations by better preserving the affine motion than PIC.

Fluid-Implicit-Particles (FLIP) Method

In various embodiments, a fluid-implicit-particles (FLIP) method may be used. This method may mitigate the dissipation in PIC by partially reserving velocities on the particles. The P2G and G2P transfers of FLIP may be summarized as the following:

FLIP P2G: $m_i^n v_i^n = \Sigma_p w_{ip} m_p v_p^n$

FLIP G2P: $v_p^{n+1} = \Sigma_i w_{ip} v_i^* + \alpha(v_p^n - \Sigma_i w_{ip} v_i^n)$ $x_p^{n+1} = x_p^n + \Delta t \Sigma_i w_{ip} v_i^*$ a may be a PIC-FLIP blending ratio, wherein, when $\alpha = 0$, this scheme may become PIC, and when $\alpha = 1$, it may turn to full FLIP. $\alpha$ may be a pre-determined value between 0 and 1, inclusive. In another implementation, α may be a value dynamically determined by the program.

Figure 4:
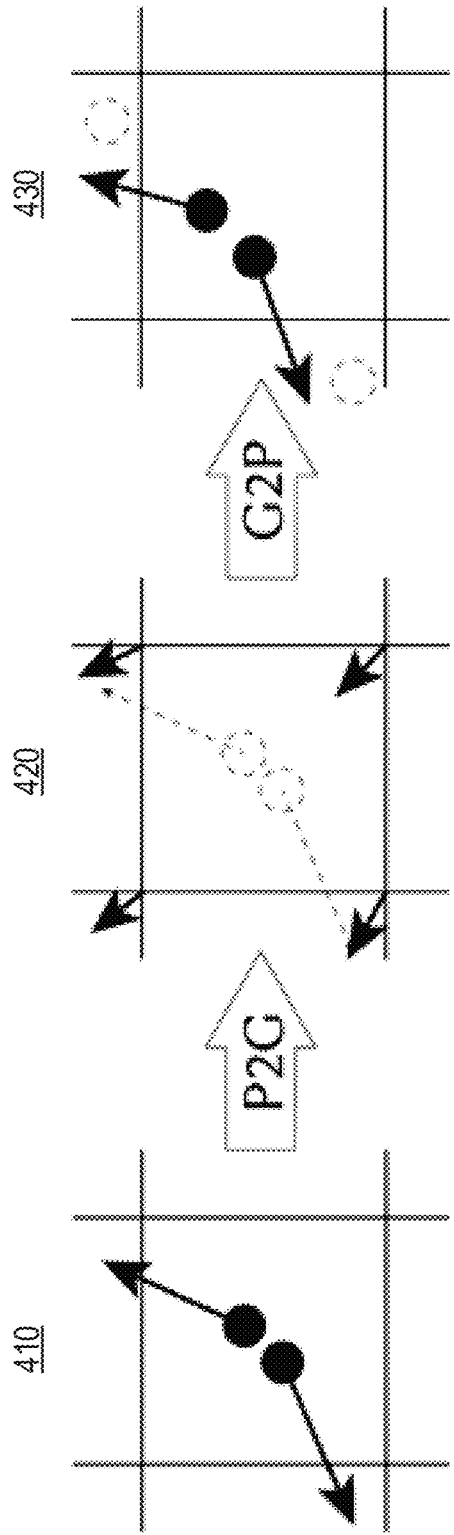
FIG. 4 illustrates a schematic diagram of using fluid implicit-particle (FLIP) method to integrate two separating particles.

There may be challenges of a phenomena, which may be referred as positional trap. Similar to PIC and APIC, FLIP may still use the nodal velocity to update particle positions. While FLIP breaks the velocity continuity, it may still suffer from dissipation and unphysical viscosity. FIG. 4 shows an example of such dissipation that happens during the separation of two particles. In FIG. 4, FLIP is used to integrate two separating particles. In 410, two particles are separating with large velocities in opposite directions. In 420, the velocities are averaged to nodes after P2G. In 430, the nodal velocities are used to integrate positions, and the particles have not been moved to their deserved positions (dashed circles). Instead, they only slightly separate from each other, even if they should be significantly separated from each other according to their velocities.

Thus, the particles are trapped inside the region formed by deformed grid nodes in their vicinity due to the interpolation, even if their velocities indicate a significant separation at the next time step. this behavior may be referred as the positional trap. One or more the following embodiment may be used to untrap the particles.

Naturally-Modified FLIP (NFLIP) Method

In various embodiments, a naturally-modified FLIP (NFLIP) method may be used. Based on FLIP, NFLIP may match the position update with the velocity update in FLIP by adding a term of positional adjustment to overcome the positional trap. The P2G and G2P transfers of NFLIP may be summarized as the following:

NFLIP P2G: $m_i^n v_i^n = \Sigma_p w_{ip} m_p v_p^n$

NFLIP G2P: $v_p^{n+1} = \Sigma_i w_{ip} v_i^* + \alpha(v_p^n - \Sigma_i w_{ip} v_i^n)$ $x_p^{n+1} = x_p^n + \Delta_t [\Sigma_i w_{ip} v_i^* + \alpha(v_p^n - \Sigma_i w_{ip} v_i^n)]$ Similar to the velocity adjustment, the positional adjustment contains high-frequency displacement information that has not been eliminated during the P2G and G2P process. The positional trap may be eased by adding such information to the integration of positions.

Figure 5:
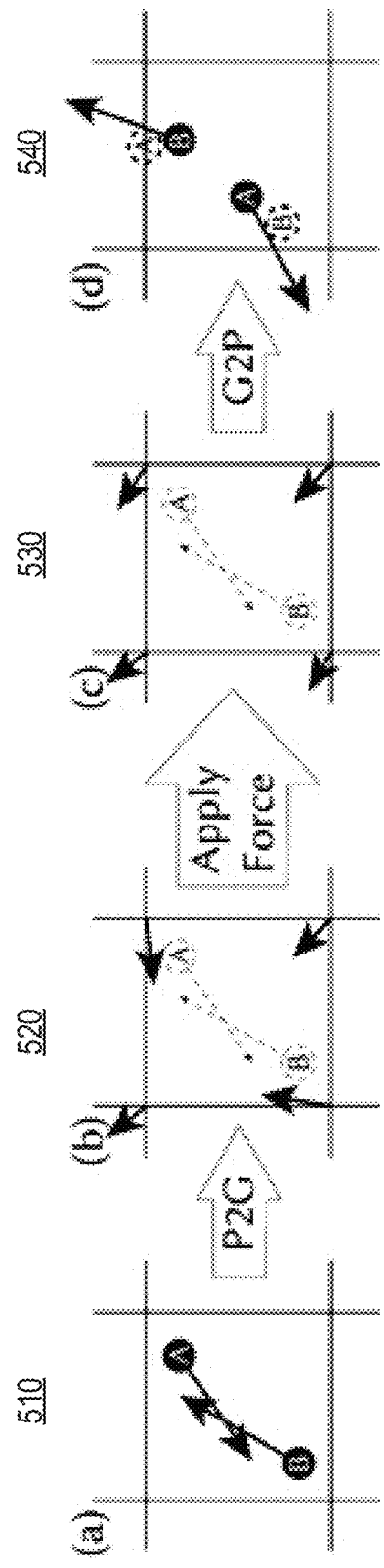
FIG. 5 shows a schematic diagram of an embodiment providing a trap-breaking capability.

FIG. 5 shows a schematic diagram wherein this positional adjustment moves the particles closer to the locations indicated by the dashed circles, providing the trap-breaking capability. In 510, two particles (marked with A and B) are moving closer with large velocities. In 520, the velocities are averaged to nodes after P2G. In 530, collisional force is applied to the nodal velocity. In 540, the particle velocities are used to integrate positions, and the particles penetrate each other and ignore any collisional force applied. Instead, if the nodal velocity is used to integrate the particle positions, the particles would end up in the dashed circles.

Figure 6:
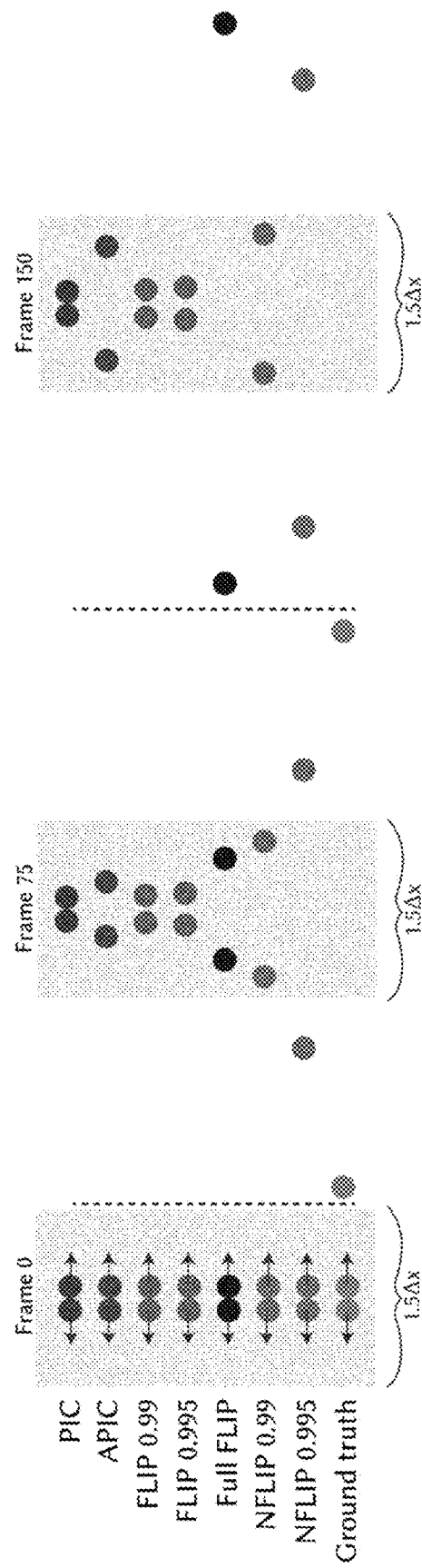
FIG. 6 shows a schematic diagram of comparison between different advection methods.

FIG. 6 shows a comparison of the above embodiments, including PIC, APIC, FLIP, and NFLIP, where two particles initially have velocities of the same magnitude but opposite directions. In this setup, since there is no external force to deter particles from separation, particles may keep moving away from each other. This comparison shows integration schemes' capacities to handle the particle separation and break the positional trap. In FIG. 6, comparison between different advection methods is performed. Two particles are moving away from each other with velocities of the same magnitudes but opposite directions. The cell size is $\Delta x$ and the initial distance between them is $0.2\Delta x$. For simplicity, $v_i^* = v_i^n$ is assumed: sand or any non-cohesive material may be used, i.e., no force is generated due to the separation, and gravity is turned off. B-spline weighting function is adopted, and the width of the kernel is $1.5\Delta x$ (whose affected region is in grey). The ground truth is analytic, i.e., x=v. FLIP or NFLIP with α=0.99 is referred as FLIP 0.99 or NFLIP 0.99, respectively. FLIP or NFLIP with α=0.995 is referred as FLIP 0.995 or NFLIP 0.995, respectively.

There may be some issues/problems/defects/disadvantages for one or more methods, which are described above.

For one example, in PIC, particle dynamics may be stably integrated but notably suffer from excessive dissipation. The nodes usually have fewer degrees of freedom than the particles do (e.g., one node corresponds to eight or more particles in three dimensions). Thus, even if the particles have some high-frequency velocity modes, they may be eliminated after being transferred to the grid.

For another example, APIC may produce more energetic simulations by better preserving the angular momentum than PIC. The affine matrices from different particles may add velocity increments with different directions, but such increments may still get averaged at grid nodes. Thus, in the scenarios such as separating strands and droplets, APIC may suffer from a similar problem: the discontinuous particle velocities are soon smoothed during P2G and G2P.

For another example, the simulation results from FLIP may usually be more energetic than those produced with PIC or even APIC in certain scenes. The FLIP ability to retain momentum for each particle owes to the velocity adjustment term, which is some scale of the difference between the particle velocity and the interpolated one from grid velocities. Nevertheless, as PIC and APIC, FLIP may fail to break the positional trap and/or still suffer from numerical viscosity as explained in the previous section. In practice, the full FLIP may produce noisy and unstable results since it has no damping to the high-frequency motion.

For another example, even though NFLIP seems to handle the positional trap properly, it may have its own deflects. When particles are being compressed, the positional-trap-breaking capability might lead to unphysical penetration or even velocity multi-streaming: particles at the same location may end up with very different velocities. Nearby particles may ignore the collisions between each other since the stress is only resolved on the nodes. Each particle has its displacement, to some extent, independent of the nodal velocities. Another issue of NFLIP may be that the particle-boundary collisions may not be correctly handled. In MPM, the collision between the simulated material and boundaries is resolved on the nodes instead of the particles. For example, when the grid nodes inside static collision objects are enforced to have zero velocities, particles advected with either FLIP or NFLIP may still have non-zero velocities when they move into the boundary. Furthermore, the positional adjustment of NFLIP may continuously move the particles deep into the boundary, making the penetration much worse than FLIP.

The following various embodiments may include a heuristic scheme, addressing at least one of the issues/problems/defects/disadvantages described above. For example, a heuristic FLIP (HFLIP) may aim to resolve traditional integration schemes' challenges for less numerical dissipation and easier particle separation, without bringing new defects described in the section of NFLIP above. Furthermore, by combining APIC and FLIP, a new integrator affine-augmented FLIP (AFLIP) may be better at preserving energy. With the heuristic assumption, velocity/positional adjustment, and/or affine information transfer, a new affine-augmented heuristic FLIP (AHFLIP) scheme may preserve total energy better than previous methods, as well as preventing numerical stickiness and viscosity in MPM simulation.

Heuristic FLIP (HFLIP) Scheme

In various embodiments, a heuristic FLIP (HFLIP) scheme (or method) may be used. The scheme or method may be advantageous for a wide range of materials, for example but not limited to, materials that are brittle (i.e. with low ductility) in all (e.g., sand) or partial directions (e.g., directions perpendicular to a hair strand) for low numerical dissipation and easier particle separation. The HFLIP may fix some or all of NFLIP's defects.

In HFLIP, a trap-breaking ratio $\beta_p$ may be used to control the magnitude of the positional adjustment better.

HFLIP P2G: $m_i^n v_i^n = \Sigma_p w_{ip} m_p v_p^n$

HFLIP G2P: $v_p^{n+1} = \Sigma_i w_{ip} v_i^* + \alpha(v_p^n - \Sigma_i w_{ip} v_i^n)$ $x_p^{n+1} = x_p^n + \Delta t [\Sigma_i w_{ip} v_i^* + \beta_p \alpha (v_p^n - \Sigma_i w_{ip} v_i^n)])$ Furthermore, the $\beta_p$ for each particle is computed with the following heuristic scheme:

$$\beta_p = \begin{cases} 0 & \text{if } \phi_{x_p^n + v_p^n \Delta t} < 0 \text{ and } \nabla \phi_{x_p^n + v_p^n \Delta t} \cdot v_p^n \leq 0 \\ 0 & \text{otherwise if } \varphi_{x_p^n + v_p^n \Delta t} < 0 \\ \beta^{min} & \text{otherwise if } J_p^{E,n+1} < J_p^c \\ \beta^{max} & \text{otherwise} \end{cases}$$

$\phi_{x_p^n + v_p^n \Delta t} < 0$ and $\nabla \phi_{x_p^n + v_p^n \Delta t} \cdot v_p^n \leq 0$ are the first heuristic scheme, referring to that a particle is at or within a boundary and moves towards the boundary. $\varphi_{x_p^n + v_p^n \Delta t} < 0$ is the second heuristic scheme, referring to that a particle is at or within a source. $J_p^{E,n+1} < J_p^c$ is the third heuristic scheme, referring to that a volume ratio for a particle is within a predetermined volume ratio threshold.

In one implementation, $\beta^{min}$ and $\beta^{max}$ are pre-defined parameters between 0 and 1, inclusive, and $\beta^{min} \leq \beta^{max}$. In another implementation, $\beta^{min}$ and $\beta^{max}$ may be parameters dynamically defined by the program. In another implementation, the trap-breaking ratio $\beta_p$ may be user-controllable parameter. In one implementation, $\beta^{min}$ may be a value between 0 and 0.05 inclusive, $\beta^{max}$ may be a value between 0 and 1 inclusive, and $\beta^{min} \leq \beta^{max}$.

Wherein, $J_p^c$, is a critical volume ratio; $\phi_x$ is the signed distance from position x to its nearest boundary, and we assume negative values indicate the interior of the boundary; $\nabla \phi_x$, the corresponding gradient at x, gives the normal direction pointing towards outside; $\varphi_x$ is similar to $\phi_x$ but it only applies to material sources, e.g., a fountain nozzle outputting water.

Figure 7:
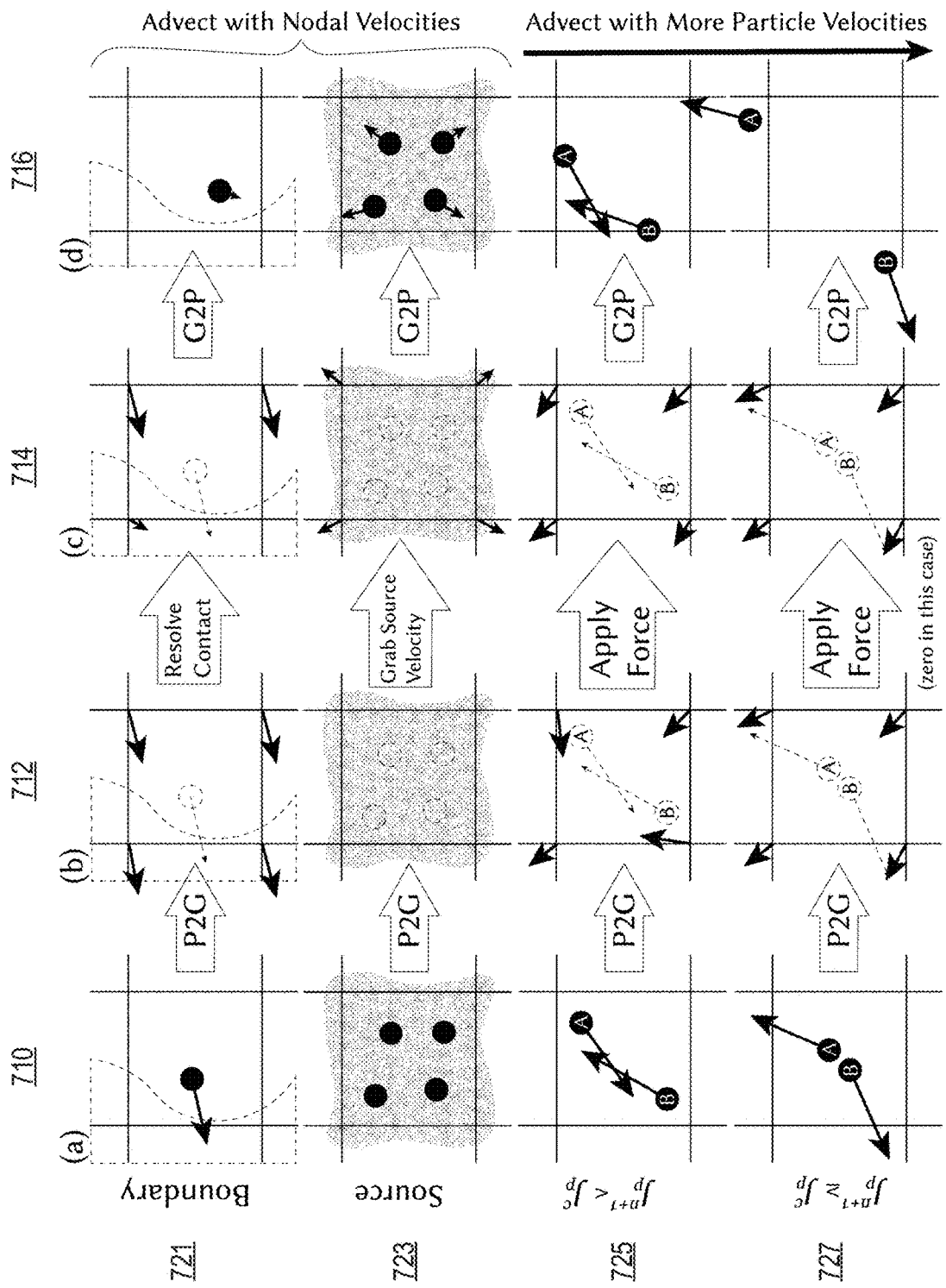
FIG. 7 shows a schematic diagram of various embodiments integrating particles in different cases.

FIG. 7 shows a chart of using HFLIP to integrate particles in different cases. For a row of 721, in a column of 710, a particle approaches the boundary; in a column of 712, a particle velocity is transferred to the nodes; in a column of 714, after resolving collisions, velocities on the nodes inside and perpendicular to the boundary are eliminated; in a column of 716, HFLIP use the grid velocity to advect particles, so that the collision is correctly handled.

For a row of 723, in the column of 710, new particles are sampled from a material source with zero velocity; in the column of 712, a particle velocity is transferred to the nodes (zero in this case); in the column of 714, a source velocity is assigned to the nodes inside it; in the column of 716, HFLIP use the grid velocity to advect particles, so that these new particles share the velocity of the source.

For a row of 725, in the column of 710, two particles (marked with A and B) are approaching each other with large and opposite velocities; in the column of 712, the velocities are averaged to nodes after P2G; in the column of 714, a collisional force is applied to the nodal velocity; and in the column of 716, HFLIP uses nodal velocity to integrate position since $J_p^{n+1} < J_p^c$, which avoids penetration.

For a row of 727, in the column of 710, two particles are separating with large velocities in opposite directions; in the column of 712, velocities are averaged to nodes after P2G; in the column of 714, forces are applied to the nodes (zero since we assume the material has broken); and in the column of 716, HFLIP uses particle velocity to integrate position, so that the particles may freely separate.

The determination of the critical volume ratio $J_p^c$, may depend on properties of the material, and may vary from materials to materials. In one implementation, $J_p^c$, may be chosen such that when $J_p^{n+1} \geq J_p^c$ the material yields or stress-free if it is non-cohesive. In the space of a principal Kirchhoff stress $\tau = \{\tau_1, \tau_2, \tau_3\}$ in three dimensions (3D) (or $\tau = \{\tau_1, \tau_2\}$ in 2D), $J_p^c$ may correspond to the case where r is at the up-right-front tip (or the up-right tip in 2D) of a specific plastic yield criterion.

Three elastoplastic models may be listed, and similar computational schemes may follow for other models.

For a first model with a weakly-compressible liquid, the deformation gradient is projected to identity (stress-free) when $J_p \geq 1$. Therefore, $J_p^c = 1$ may be chosen for this kind of material.

For a second model, the (non-cohesive) Drucker-Prager yield criterion has a tip that corresponds to $\tau_x = \tau_y = \tau_z = 0$. For Simo's neo-Hookean elastic model, such a stress-free state means $J_p = 1$. Therefore, $J_p^c = 1$ may be chosen for materials using this yield criterion.

For a third model, the non-associative Cam-clay (NACC) yield criterion projects the deformation gradient to the expansion tip when $P_p \leq \chi \kappa \sin h(\xi \max(-\alpha_p, 0))$, where $P_p$ is the pressure, $\chi$ is the cohesion coefficient, $\kappa$ is the bulk modulus, $\xi$ is the hardening factor, and $\alpha_p$ is a variable used to track hardening. When using Simo's neo-Hookean elastic model, $$J_p^c = \frac{\chi_{p,0}^P}{\kappa} + \sqrt{\left(\frac{\chi_{p,0}^P}{\kappa}\right)^2 + 1}$$

may be obtained.

Figure 8:
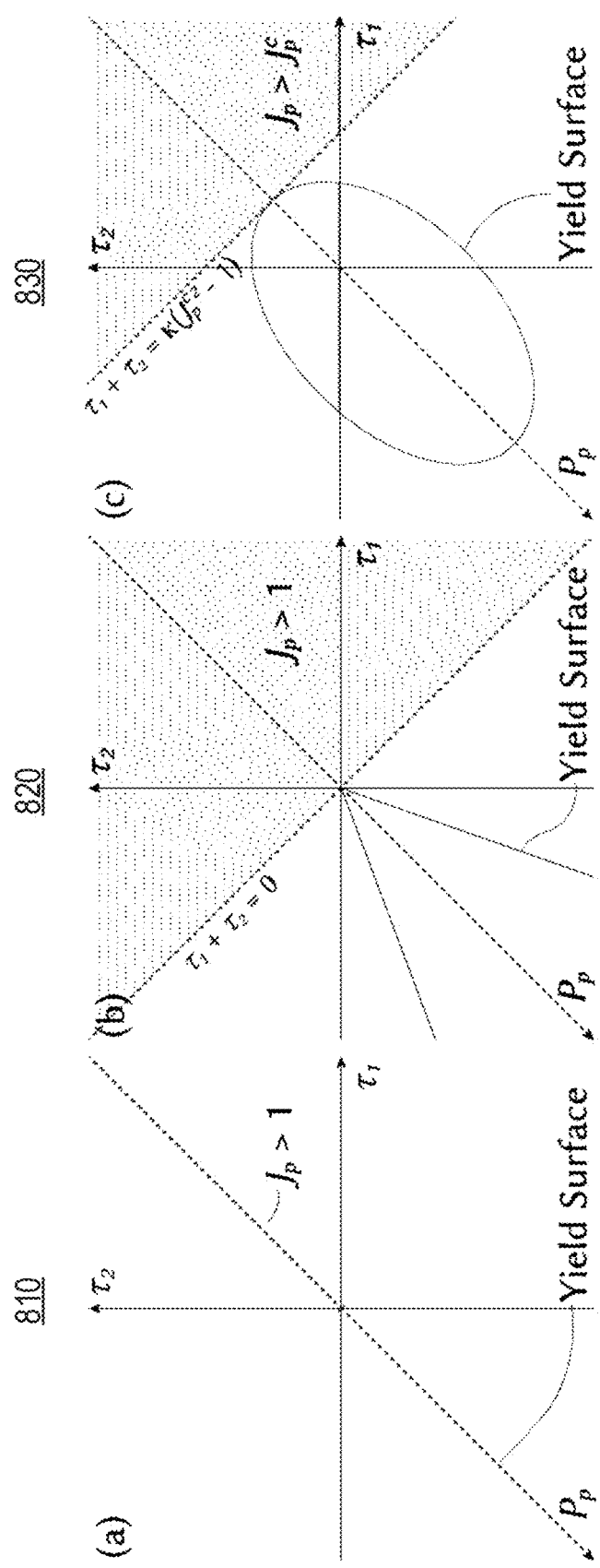
FIG. 8 shows a schematic diagram of various embodiments having different elastoplastic models.

FIG. 8 shows yield criteria and $J_p$ in the principal stress space. The feasible region may be located in the lower-left region; and the region where $J_p > J_p^c$ may be located in the upper-right region. Additionally, the axis of the pressure $P_p$ is drawn in dashed arrow.

In 810, the weakly-compressible liquid where only the dilational stress is applied (i.e., $\tau_1 = \tau_2$) and the stress is only non-zero when the material is compressive. In 820, the Drucker-Prager yield criterion with Simo's neo-Hookean elasticity is used. In 830, the NACC yield criterion with Simo's neo-Hookean elasticity is used, where $\kappa$ is the bulk modulus.

Affine-Augmented FLIP (AFLIP) Scheme

In various embodiments, an affine-augmented FLIP (AFLIP) scheme (or method) may be used. In one implementation, the FLIP-fashioned velocity adjustment may be added into APIC to obtain the AFLIP.

$$\text{AFLIP P2G: } m_i^n v_i^n = \Sigma_p w_{ip} m_p [v_p^n + C_p^n(x_i^n - x_p^n)]$$

$$\text{AFLIP G2P: } v_p^{n+1} = \Sigma_i w_{ip} v_i^* + \alpha(v_p^n - \Sigma_i w_{ip} v_i^n)$$

$$x_p^{n+1} = x_p^n + \Delta t \Sigma_i w_{ip} v_i^*$$

$$C_p^{n+1} = \Sigma_i w_{ip} v_i^* (x_i^n - x_p^n)^T (D_p^n)^{-1}$$

Wherein, $D_p^n$ may be the same matrix as the one in APIC. In one implementation, the velocity adjustment may contain all frequencies, which may be shown by comparing with high-resolution simulation using FLIP and APIC. In another implementation, the velocity adjustment may contain almost all frequencies.

The AFLIP scheme/method combining the velocity adjustment with the affine momentum tensor may bring at least two benefits as described below.

A first benefit may be that the velocity components of low-frequency (up to affine modes) may be guaranteed to be undamped in AFLIP. The FLIP-style velocity update preserves the affine motion during G2P while the affine momentum tensor $C_p^n$ independently keeps track of a second copy of the velocity gradient. Although it seems to have more information than desired in some instances, this duplication may ensure that the affine motion is not diffused. Besides, since this redundant information is of low frequency, it may not lead to instability.

A second benefit may include that visual details may be retained due to the existence of higher-frequency modes.

Affine-Augmented Heuristic FLIP (AHFLIP) Scheme

In various embodiments, an affine-augmented heuristic FLIP (AHFLIP) scheme (or method) may be used. In one implementation, the positional adjustment may be added into AFLIP for easier particle separation to obtain the AHFLIP.

$$\text{AHFLIP P2G: } m_i^n v_i^n = \Sigma_p w_{ip} m_p [v_p^n + C_p^n(x_i^n - x_p^n)]$$

$$\text{AHFLIP G2P: } v_p^{n+1} = \Sigma_i w_{ip} v_i^* + \alpha(v_p^n - \Sigma_i w_{ip} v_i^n)$$

$$x_p^{n+1} = x_p^n + \Delta t [\Sigma_i w_{ip} v_i^* + \beta_p \alpha(v_p^n - \Sigma_i w_{ip} v_i^n)]$$

$$C_p^{n+1} = \Sigma_i w_{ip} v_i^* (x_i^n - x_p^n)^T (D_p^n)^{-1}$$

Wherein, the same notations $\beta_p$ and $D_p^n$ may be adopted as in HFLIP and AFLIP. Specifically, AFLIP corresponds to the case wherein $\beta_p = 0$. A toy model may be used to illustrate the difference among HFLIP, AFLIP and AHFLIP by rotating two elastic boxes, as shown in the comparisons discussed below.

Embodiments with Other Schemes

Integration schemes, for example but not limited to PIC, FLIP, and APIC, may be special cases of integrators.

Other integration schemes may include polynomial particle-in-cell (PolyPIC) method and extended particle-in-cell (XPIC) method etc. PolyPIC is an extension of APIC by replacing the affine velocity field with a higher-order velocity field. XPIC is a heuristic method targeting striking a balance between PIC and FLIP.

Figure 23:
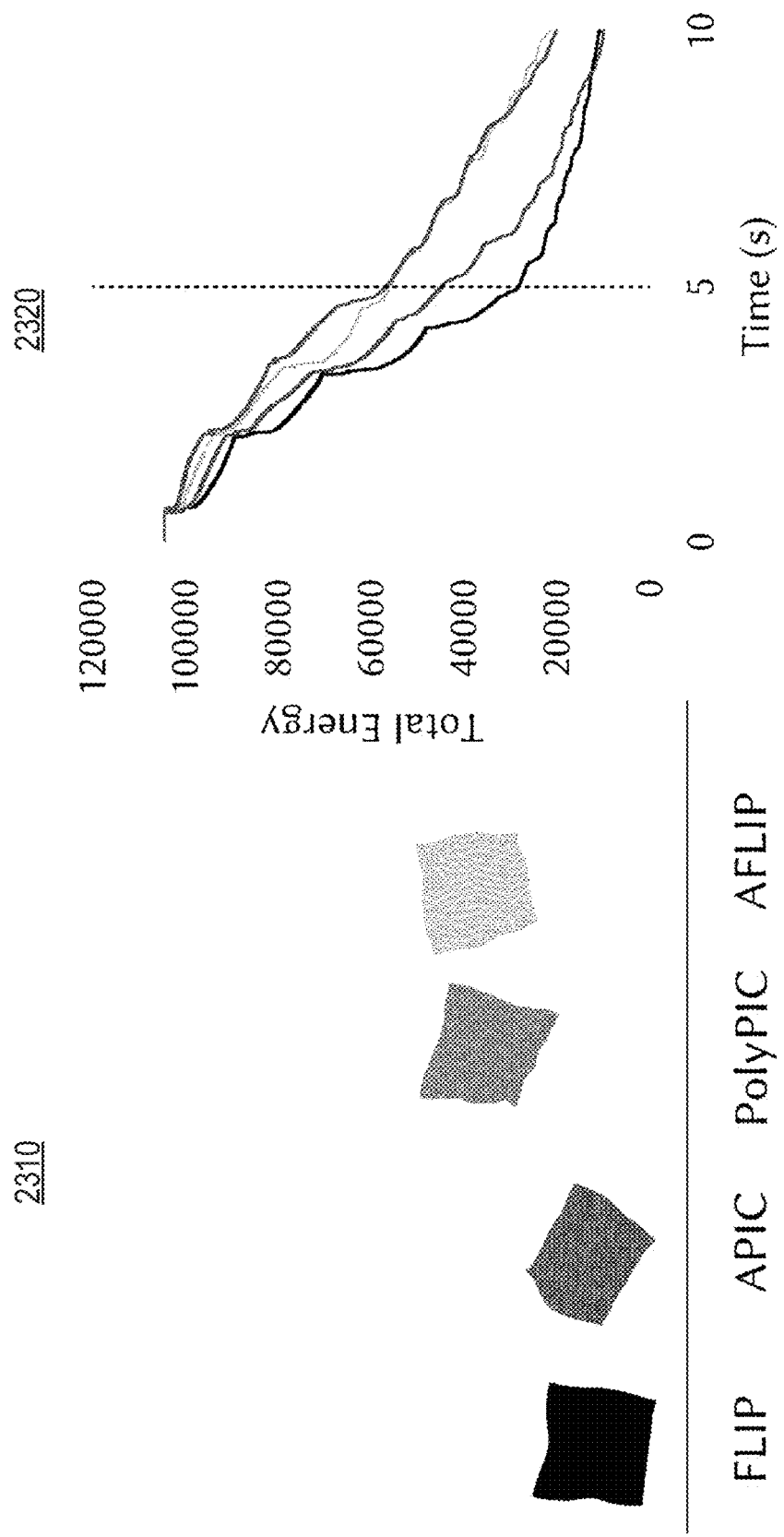
FIG. 23 shows results of various embodiments performing box dropping on a floor simulation.

In some implementations, PolyPIC and XPIC may not guarantee to break the positional trap. Even though PolyPIC may perform well in terms of preserving energy under certain circumstances, as shown in FIG. 23, the undamped PolyPIC may suffer from numerical instabilities when the higher-order modes are included.

Figure 22:
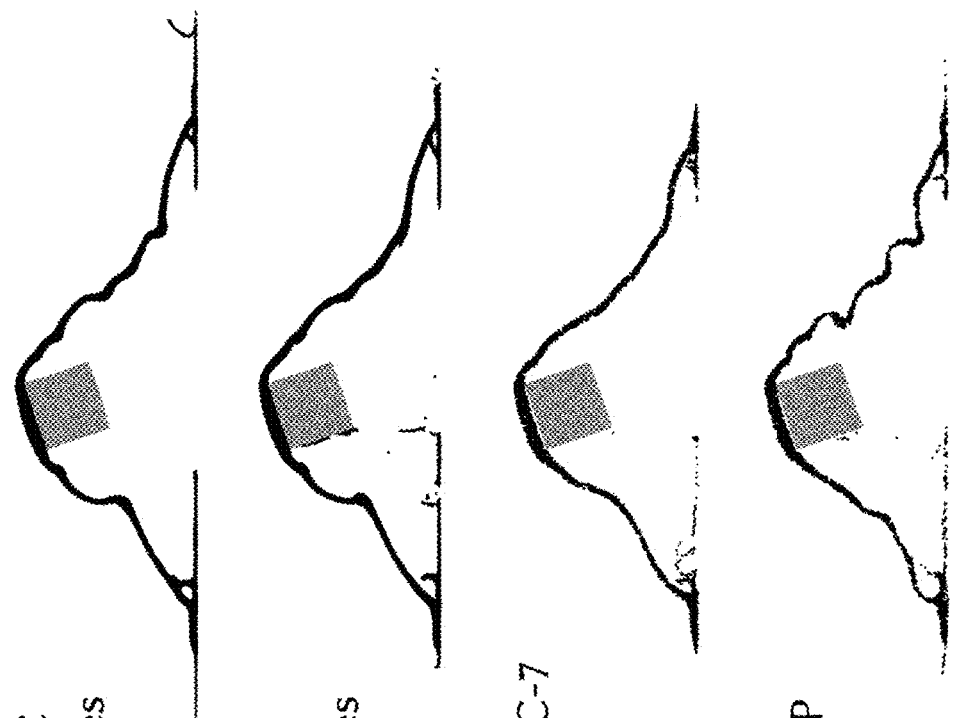
FIG. 22 shows results of various embodiments performing water drops on an elastic square simulation.
Figure 22:
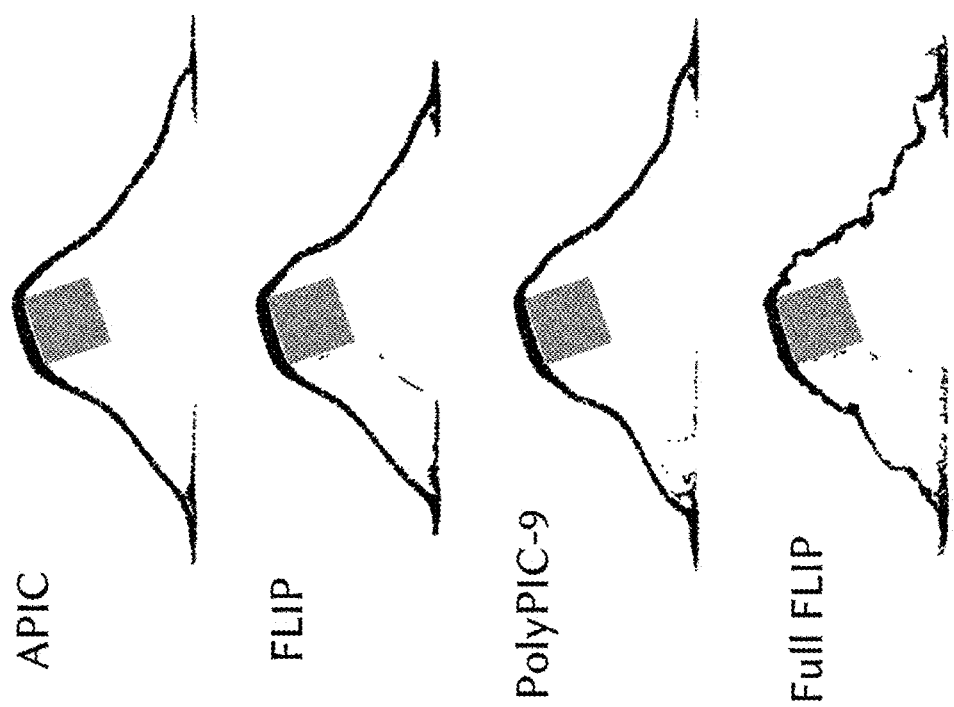

In some implementations, the damped PolyPIC may fail to reproduce the high-frequency richness of the motion as AFLIP does, as shown in FIG. 22.

There may be other methods to prevent numerical stickiness in MPM. With the integration schemes such as FLIP and APIC, alleviating this issue may require taking different strategies for different types of objects (e.g., using an additional finite element grid to detect collision for volumetric objects and incorporating explicit geometric collision resolution), which may eliminate, partially or in whole, the benefit of Lagrangian MPM; or using quadratures to enhance the subgrid treatment for free surface and interface between solid and fluid, which may be specific to incompressible liquid.

Embodiment Implementation and Comparison

One or more embodiment described in the present disclosure may be implemented and the results may be compared. HFLIP, AFLIP, and/or AHFLIP may serve as a plugin or component in an arbitrary MPM solver. The integration schemes are designed for less numerical viscosity and easier particle separation, with better energy preservation in MPM simulation. These integration schemes primarily focus on the scenarios in which materials are brittle in one or more directions. For example, the integrators work well when simulating sand, weakly-compressed water, cloth, and strands.

Implementation Details

In various implementations, for general MPM materials, the deformation gradient may be updated as $F_p^{n+1} = (I + \Delta t \nabla v_p^{n+1}) F_p^n$. Thus, the updated $J_p$ may be computed as $\det(F_p^{n+1})$.

In various implementations, for MPM materials where the stress depends only on $J_p$ (e.g. weakly-compressible liquid). (e.g., weakly-compressible liquid), a more accurate computation of $J_p^{n+1}$ may be provided when $\Delta t$ is large, $J_p^{n+1} = \exp(\Delta t \cdot v_p^{n+1}) J_p^n$, and this formula may be derived using Jacobi's formula.

In various implementations, for MPM materials where the deformation gradient is stored and updated on the element centroids instead of particles/vertices (e.g., the center of a segment in a strand or centroid of a triangle in a cloth mesh), an additional $J_p^n$ may be stored on each vertex, and may be updated with the exponential evolution formula.

In various implementations, MPM solvers may be commonly based on the multi-threaded CPU or GPU on a single or multiple machines. Thus, as a component in MPM solver, the integration schemes AFLIP, HFLIP and AHFLIP may be executed on either CPU or GPU. The simulation results may be obtained from the MPM solvers running on Intel i9-9900K 3.6 GHz CPU (16 threads) and NVIDIA GeForce RTX 2080Ti GPU.

User Interface in Product

The integrators AFLIP, HFLIP, and AHFLIP may be compatible with an arbitrary MPM solver. An MPM solver may be executed as a stand-alone library or built as a customized software component such as Unreal Engine 4 (UE 4), Maya, and Houdini. The integration schemes may be developed in UE4 as a component in an MPM solver plugin (Physion4UE). Users may tune the FLIP ratio and trap-breaking ratio (a parameter in the heuristic scheme) in the integration schemes in this plugin to achieve different simulation details according to their artistic needs (e.g., cohesive hair strands or loose ones). An example is described to illustrate how some embodiments of the present disclosure may be used in a production workflow for the MPM simulation of hair strands in UE4.

Scene Setup

Figures 9, 10:
FIG. 9 shows a schematic diagram of an initial scene for hair strands simulation.
FIG. 10 shows a schematic diagram of an embodiment with a user interface of integration scheme.

With Physion4UE, an initial scene may be setup for hair strands simulation with a Physion Strands Actor and a Physion Skeletal Sdf Actor. FIG. 9 shows one example.

Adjust Integration Schemes in Scenario

After the initial setup, a Physion Scenario Actor may be created, which manages the simulation details in this scene. Besides all the related parameters, such as simulation resolution, an "Integration" section may be found in the details panel (as shown in FIG. 10), which provides the user interface for customizing the MPM simulation integration scheme. This section exposes the following parameters for tuning.

Integration Type: the type of integrator.

Flip Ratio: the amount of blending of FLIP.

Min Flip Symplecticity: $\beta^{min}$, a parameter related to the trap-breaking ratio in the heuristic scheme.

Max Flip Symplecticity: $\beta^{max}$, a parameter related to the trap-breaking ratio in the heuristic scheme.

Affine Stretching Ratio and Affine Rotational Ratio: this pair of parameters controls the amount of blending of symmetric part and skew-symmetric part of the affine matrix respectively. When affine stretching ratio and affine rotational ratio are both 1, all the affine information is kept. When both of them are 0, no affine information is kept.

FIG. 10 shows a user interface of integration schemes in UE4. After the setup of the scenario is ready, the set parameters of the integrator may be selected for the simulation.

Execute Simulation and Visualize Result

Figure 11:
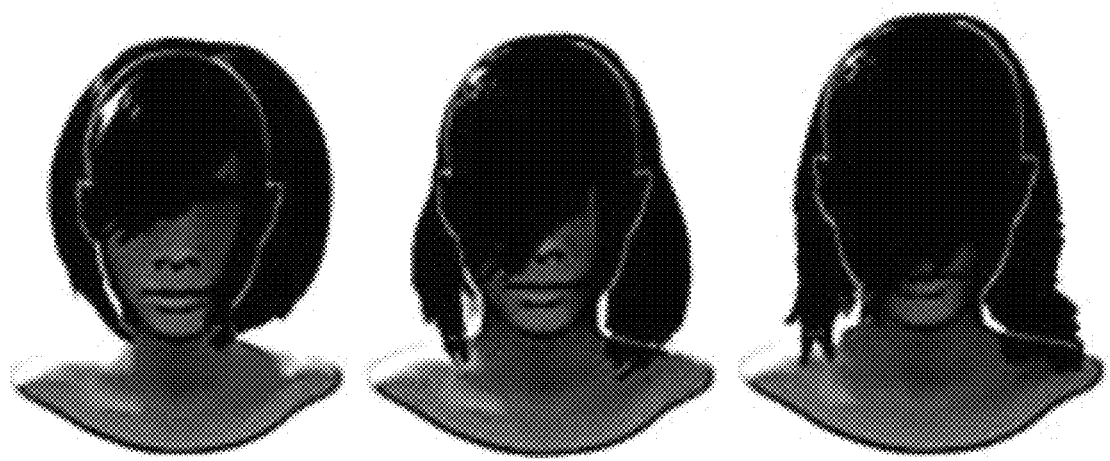
FIG. 11 shows results of an embodiment performing hair strand simulation.

After the initial setup of the scene and selecting parameters, a "Play" button may be clicked and the simulation is executed. The simulation results may be visualized. FIG. 11 shows an example of hair strand simulation.

Table 1 shows a comparison result of different integration types and summarizes the features on multiple levels. The various embodiments with using HFLIP, AFLIP, and AHFLIP may show significant advantages in some aspects.

TABLE 1

Comparison result of different integration types

| Integrators | Diminish G2P Smoothing | Preserve Sub-grid Motion | Undamp Affine Motion | Handle Boundary Condition | Easy Seperation | Energetic Level |
|---|---|---|---|---|---|---|
| PIC | x | x | x | ✓ | x | ★ |
| APIC | x | x | ✓ | ✓ | x | ★★ |
| FLIP | ✓ | x | x | ✓ | x | ★★ |
| NFLIP | ✓ | ✓ | x | x | ✓ | ★★ |
| HFLIP | ✓ | ✓ | x | ✓ | ✓ | ★★ |
| AFLIP | ✓ | x | ✓ | ✓ | x | ★★★ |
| AHFLIP | ✓ | ✓ | ✓ | ✓ | ✓ | ★★★ |

Table 1 includes one or more features, for example, whether the integrator diminishes smoothing of velocity in G2P to have a more energetic simulation, whether it may preserve sub-grid motion to have an easier separation of particles, and/or whether the affine motion is undamped.

Figure 12:
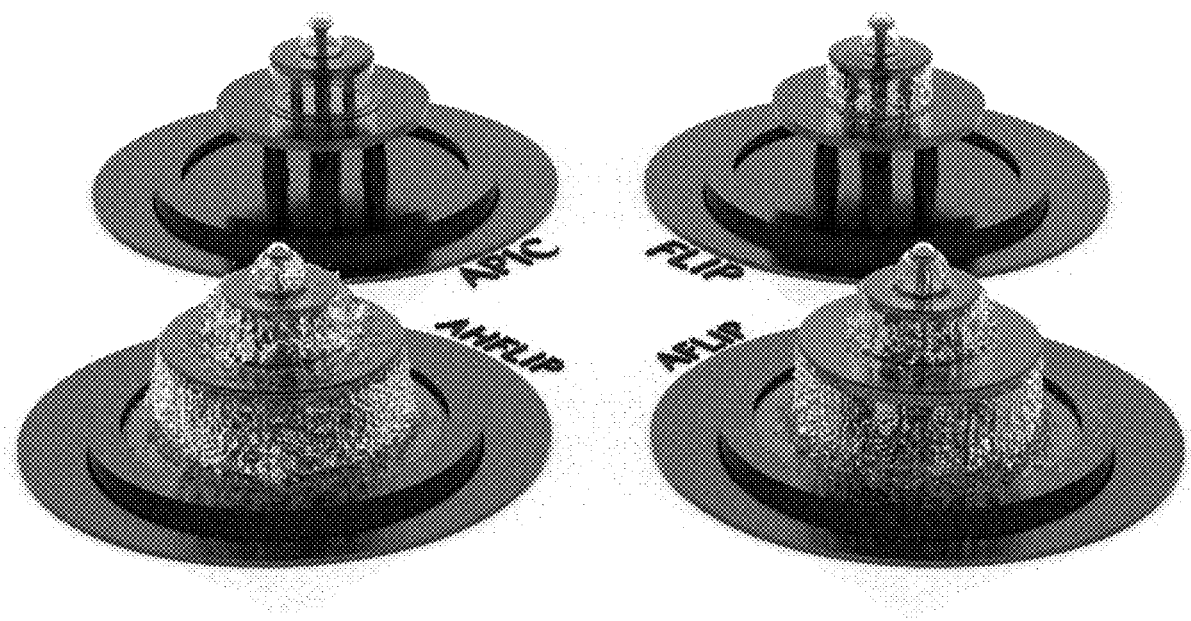
FIG. 12 shows results of various embodiments performing weakly-compressible water simulation.

FIG. 12 shows results of weakly-compressible water simulation with FLIP, APIC, AFLIP, and AHFLIP.

Figure 13:
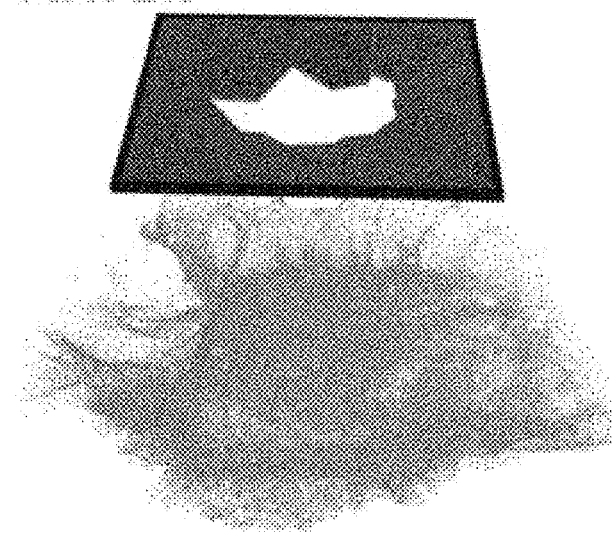
FIG. 13 shows results of an embodiment performing sand and elastic volumetric object simulation.

FIG. 13 shows simulation of sand and elastic volumetric objects using AHFLIP.

Figure 14:
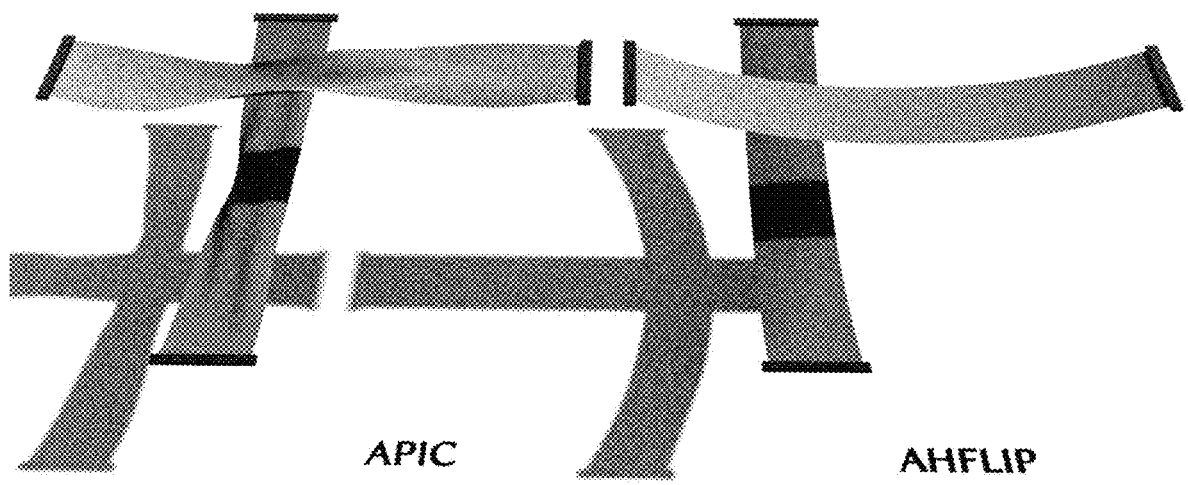
FIG. 14 shows results of various embodiments performing cloth simulation.

FIG. 14 shows results of cloth simulation using APIC and AHFLIP.

Figure 15:
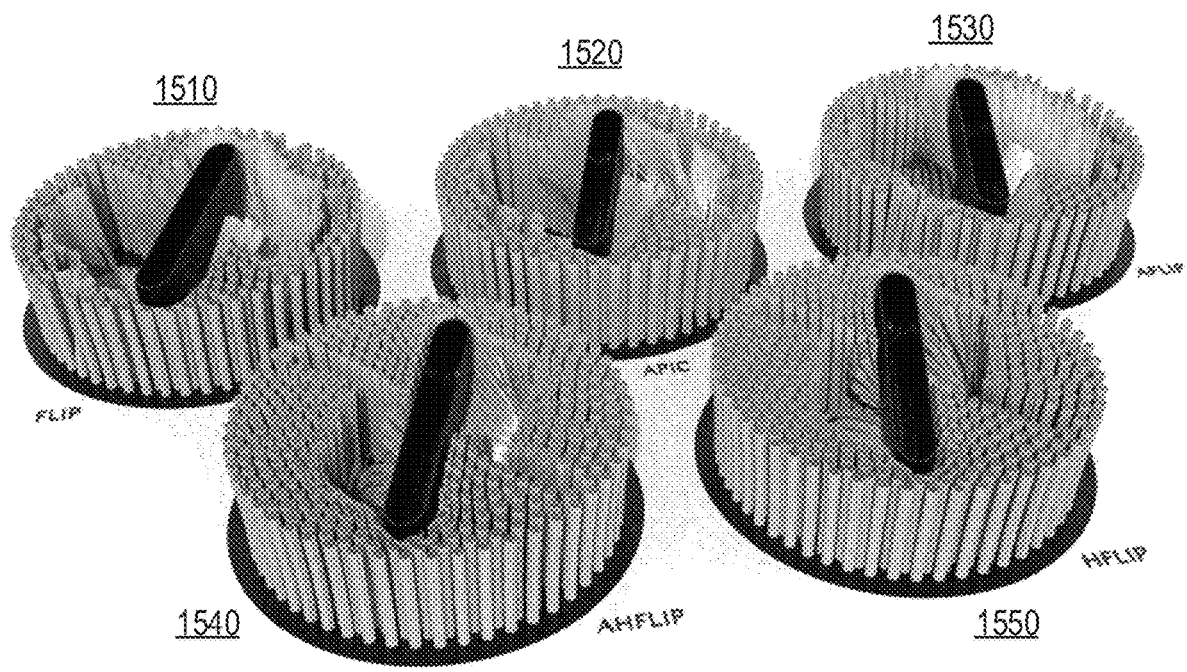
FIG. 15 shows results of various embodiments performing strands simulation.

FIG. 15 shows results of strands simulation using FLIP (1510), APIC (1520), AFLIP (1530), HFLIP (1550) and AHFLIP (1540).

In the following examples, both 2-dimensional and 3-dimensional examples may be used to better illustrate the advantages of AFLIP, HFLIP, and AHFLIP over one or more methods. For some of the examples, the energy plot may be included to show the energy preservation or conduct discrete Fourier analysis to demonstrate he integration schemes' efficacy.

Figure 16:
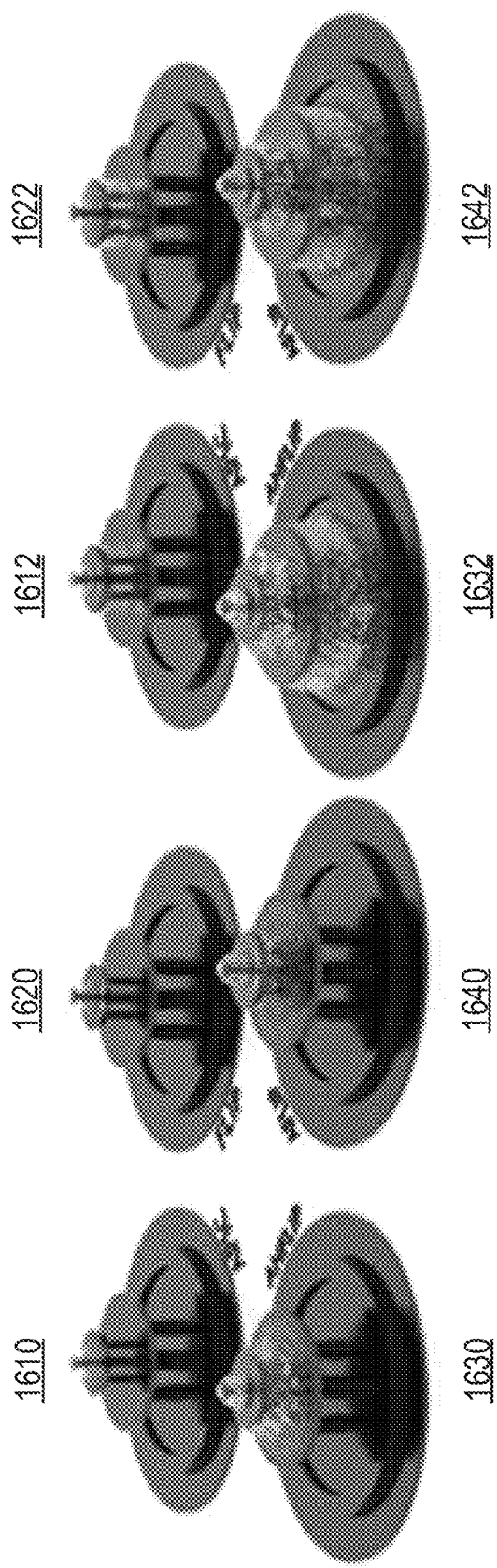
FIG. 16 shows results of various embodiments performing water spray from a fountain nozzle simulation.

FIG. 16 shows results of simulating water spray from a fountain nozzle. 1610 and 1612 are for APIC; 1620 and 1622 are for FLIP; 1630 and 1632 are for AHFLIP; and 1640 and 1642 are for AFLIP. AFLIP and AHFLIP may induce much less dissipation than the other two methods, so liquid particles are more spread out within the same period. The particles are also easier to separate when their positions are integrated with the heuristic modification in HFLIP and AHFLIP methods. The water splash is more energetic than the integrators without the heuristic modification, correspondingly.

Figure 17:
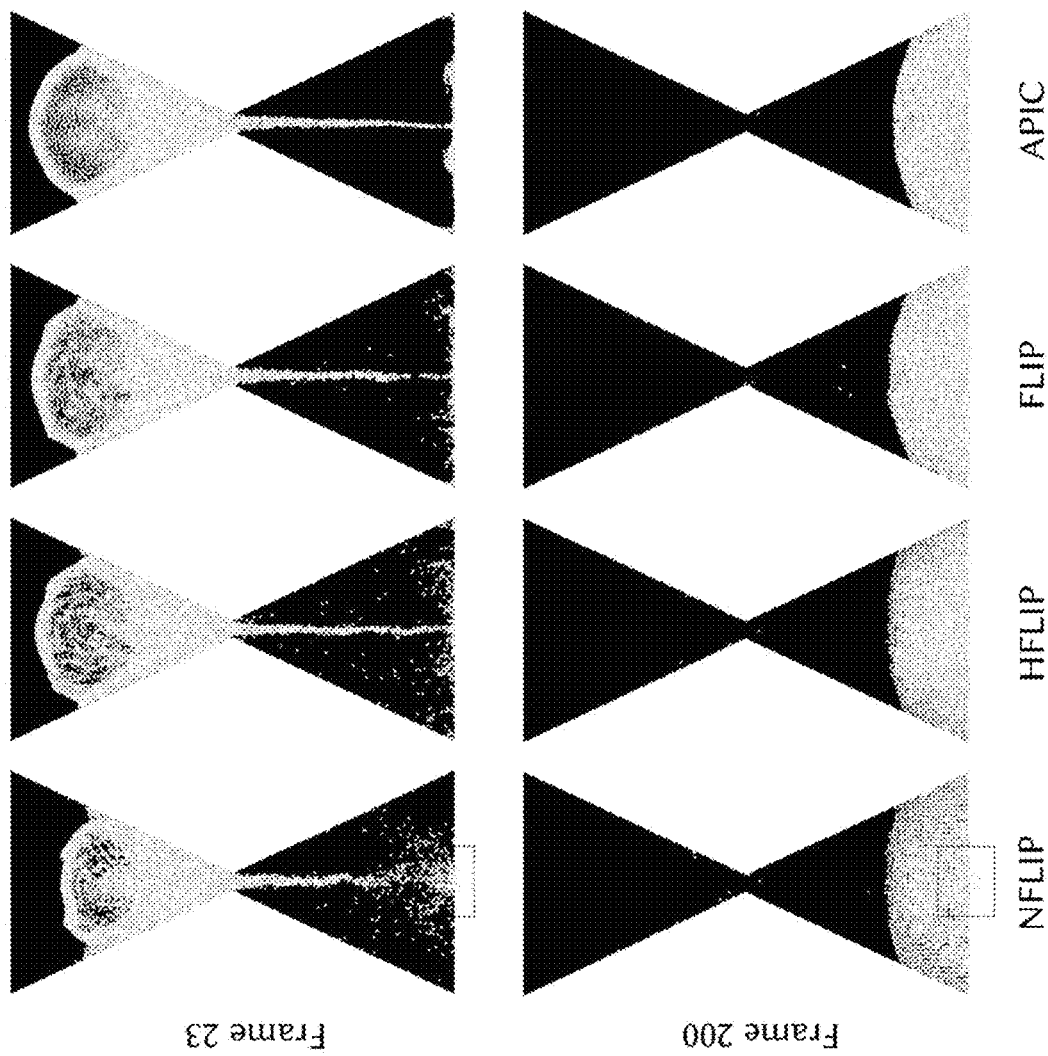
FIG. 17 shows results of various embodiments performing sand pouring into an hourglass simulation.

FIG. 17 shows results of simulating sand pouring into an hourglass. Simulations by NFLIP and HFLIP have more flying sand particles than FLIP and APIC. Notice that APIC has almost no flying sand particles since particle velocities are directly interpolated from grid nodes. Furthermore, in NFLIP, particles penetrate deep into the ground (marked by a dashed rectangle) while HFLIP correctly handles the boundary condition.

Figure 18:
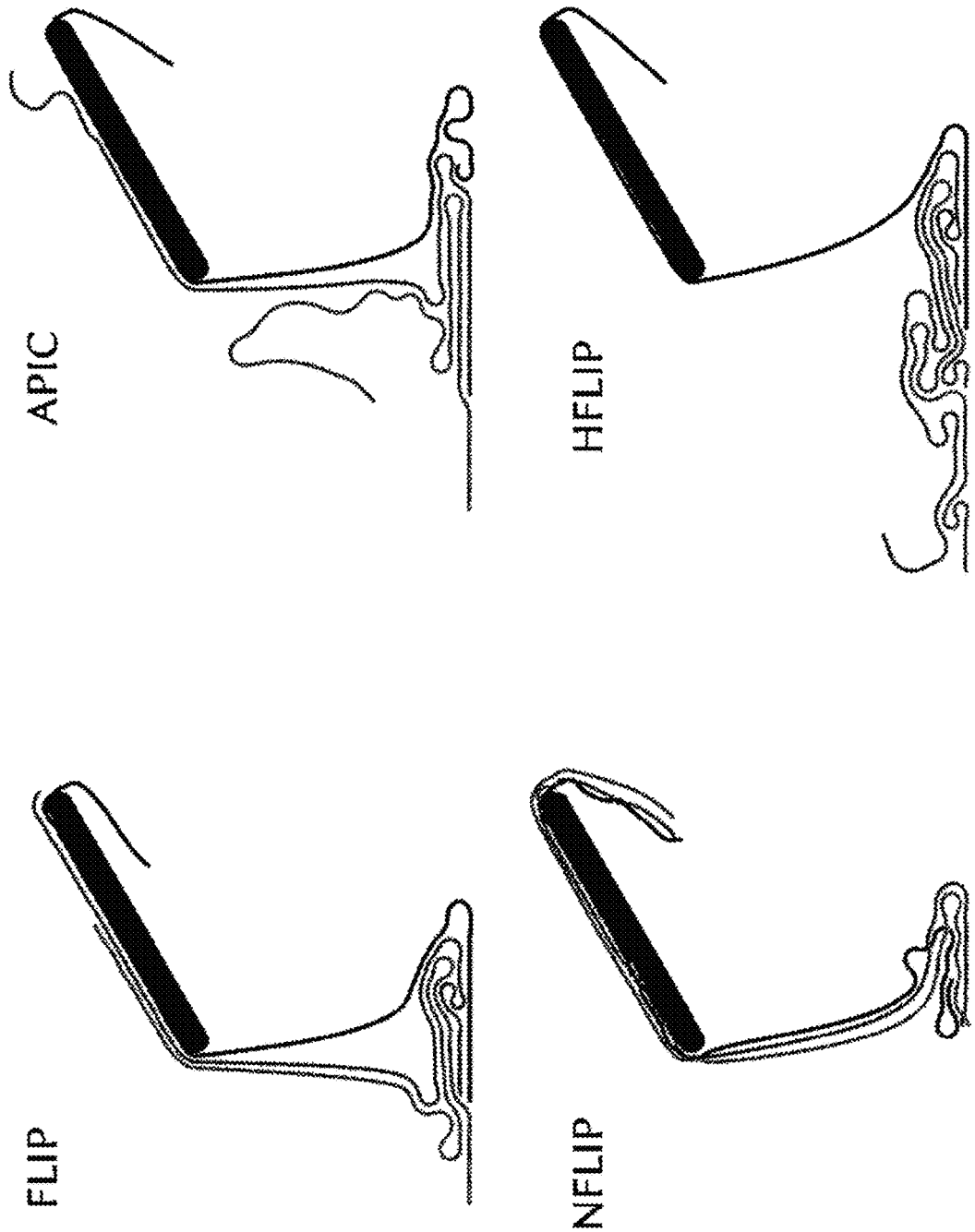
FIG. 18 shows results of various embodiments performing fiber piling simulation.

FIG. 18 shows results of simulating fiber piling. Friction between fibers has been turned off. Ideally, the fibers should rapidly slide without delay or penetration. With NFLIP, fibers may penetrate each other and may result in incorrect behavior. Fibers with HFLIP may slide down much faster than FLIP and APIC.

Figure 19:
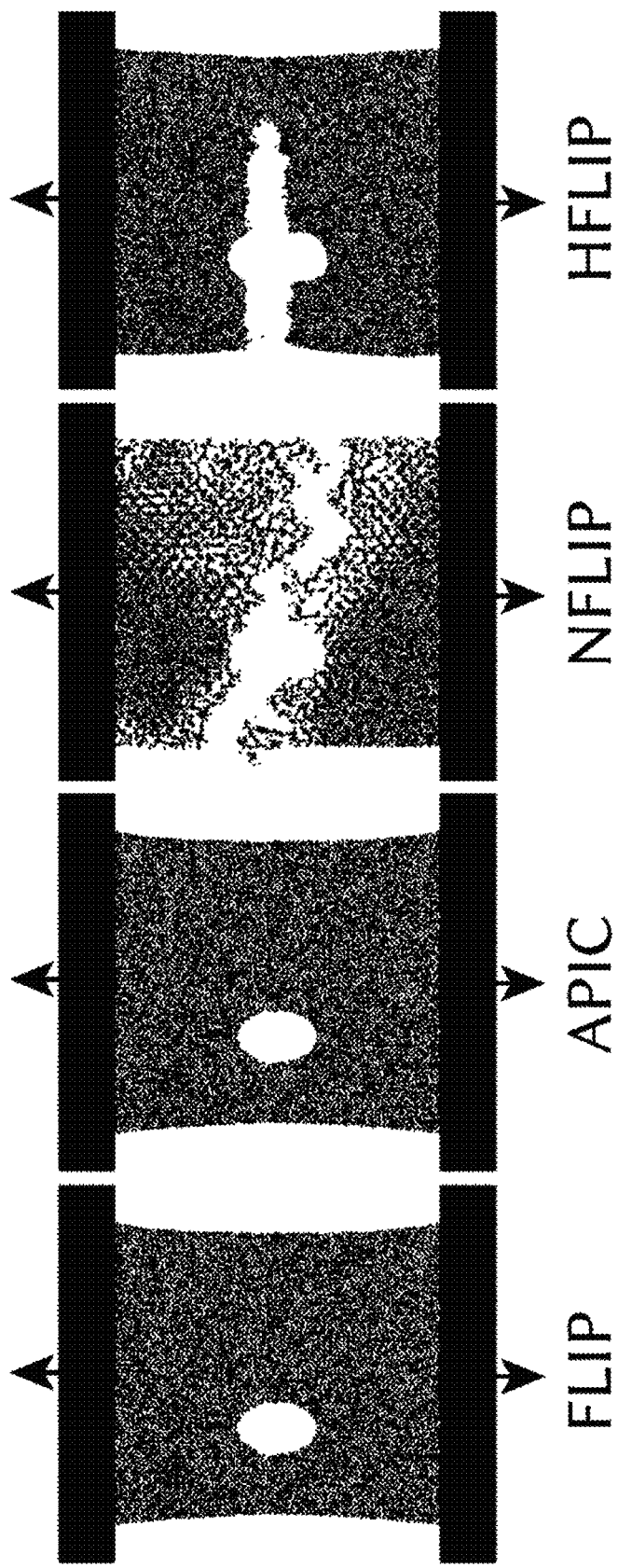
FIG. 19 shows results of various embodiments performing tearing a bulk of wet clay simulation.

FIG. 19 shows results of simulating tearing a bulk of wet clay. A bulk of wet clay with the non-associative Cam-Clay plastic model is simulated with different integrators. The up and bottom ends of the clay are fixed on two kinematically separating bars. With HFLIP, particles are easier to separate, without the numerical dissipation observed in FLIP and APIC, while severe artifacts appear in the simulation with NFLIP.

Figure 20:
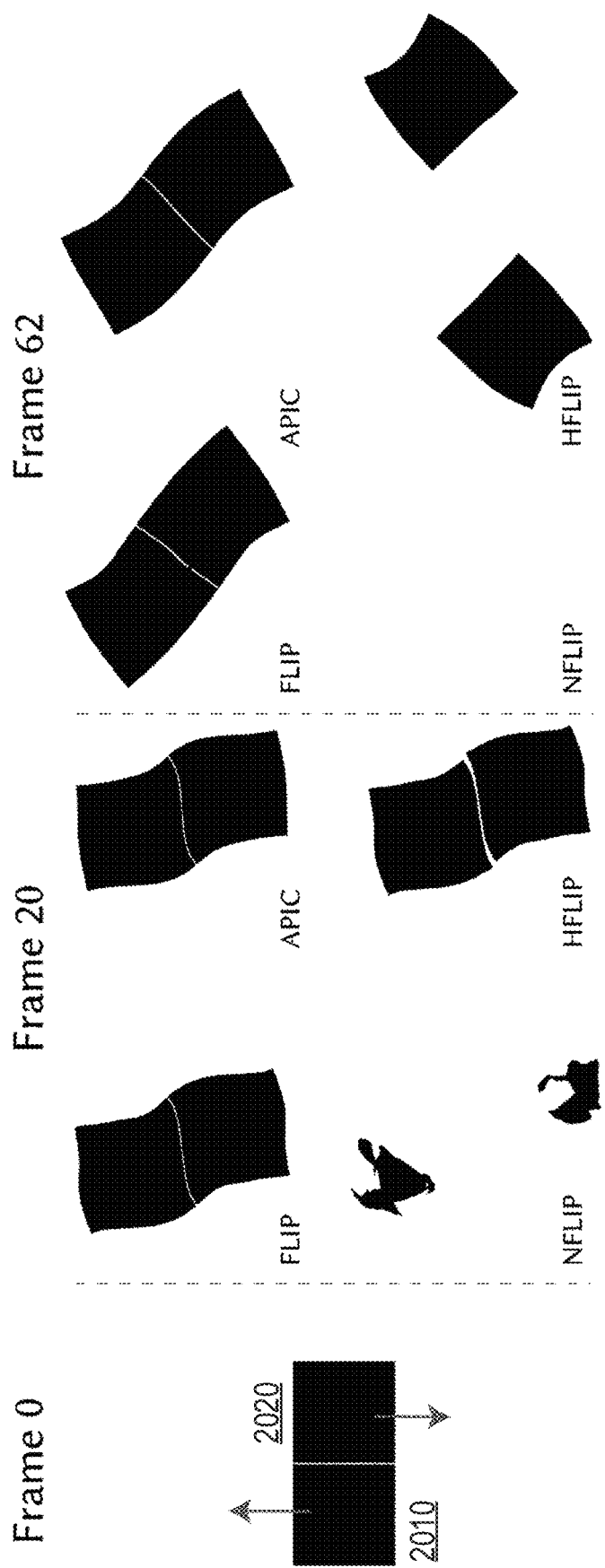
FIG. 20 shows results of various embodiments performing two rotating squares simulation.

FIG. 20 shows results of simulating two rotating squares. Two 2D squares are placed side by side. The left one (2010) has an initially upwards velocity, while the right one (2020) has an initially downwards velocity. Stress over the particles' deformation gradient may not be computed, instead, a finite element (FE) mesh may be embedded to each square: the elastic potential energy is calculated only from the deformation of the FE triangles while Lagrangian forces at mesh vertices are redistributed to the MPM grid nodes. This scheme may eliminate the influence of one block's constitutive model on another block. Since there is no stress applied between the two squares, they are supposed to separate very soon.

Figure 21:
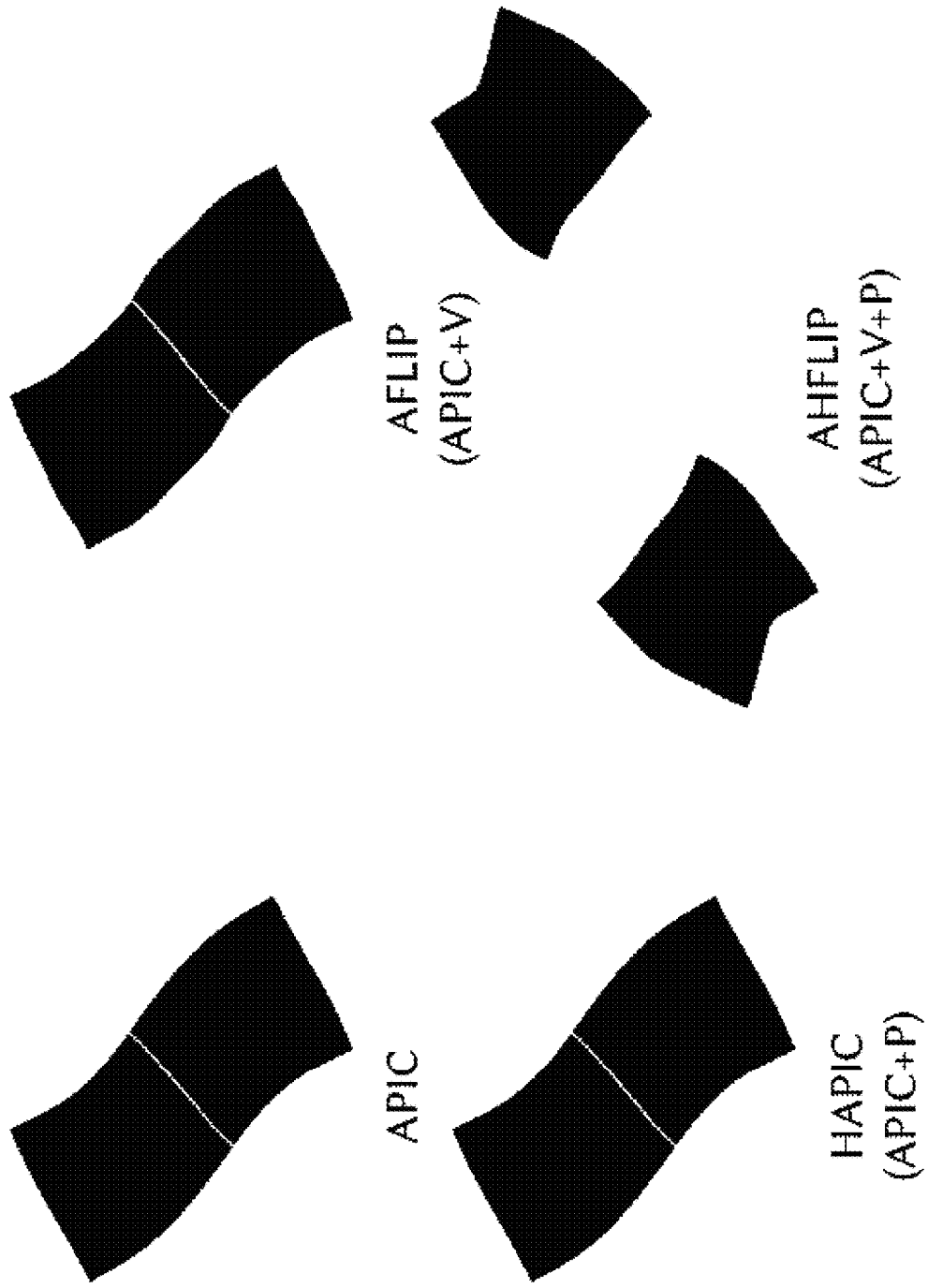
FIG. 21 shows results of various embodiments performing two rotating squares simulation.

FIG. 21 shows results of another simulation, investigating whether adding the positional (+P) or the velocity (+V) adjustment to APIC would have the two squares separate from each other. This example shows that the two squares only separate when both the positional and velocity adjustments are added.

FIG. 22 shows results of simulating water drops on an elastic square. Box-shaped weakly-compressible liquid is dropped onto a rotating elastic box. The box is embedded with a finite element mesh to prevent possible material damage. AFLIP with 0.9 reproduces the complex structure in the high-res simulations, and is immune to the irregular bumpy surfaces in full FLIP. For PolyPIC, the first four modes may be kept unchanged but higher modes may be scaled down for better stability. For PolyPIC-9, mode 5-6 are scaled by 0.825 and mode 7-9 are scaled by 0.2. For PolyPIC-7, mode 5-7 are scaled with 0.825, but it still explodes after this frame. In either case, PolyPIC fails to reproduce the structure.

FIG. 23 shows results of simulating box dropping on the floor. A finite element mesh is embedded to provide elasticity. 2310 shows a screenshot of the animation. 2320 shows their total energies over time. The dashed line indicates the time of the screenshot on the left.

Figure 24:
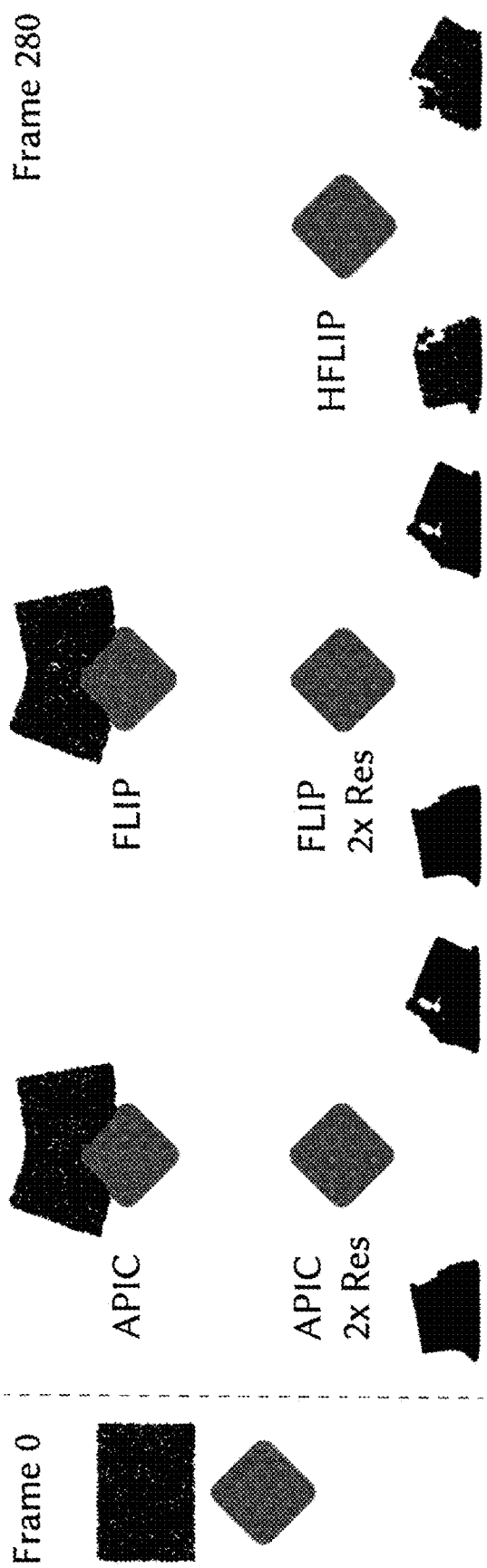
FIG. 24 shows results of various embodiments performing fracture simulation.

FIG. 24 shows results of simulating fracture. A rectangle falls onto a wedge and then collides onto the ground: The rectangle breaks into pieces with HFLIP, FLIP (2× resolution), and APIC (2× resolution). HFLIP can reproduce the fracture of high-resolution simulation using FLIP and APIC.

Figure 25:
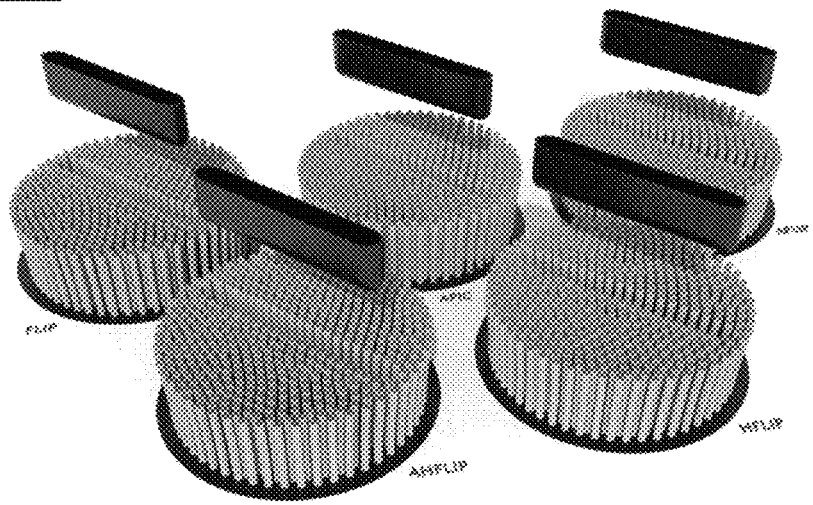
FIG. 25 shows results of various embodiments performing pressed brush simulation.
Figure 25:
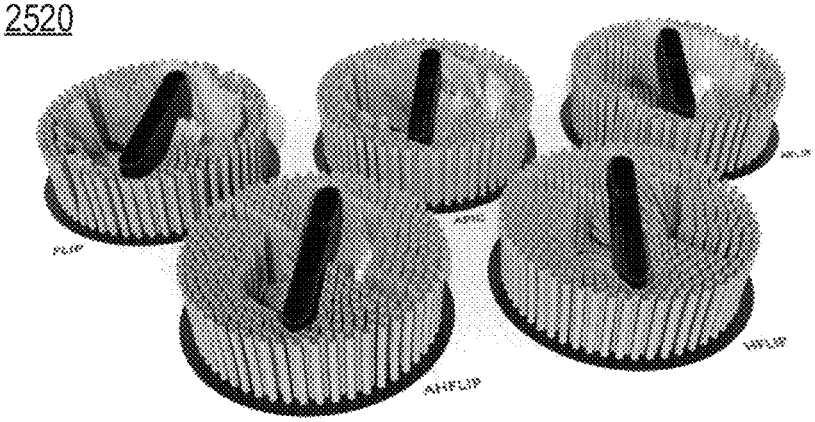
Figure 25:
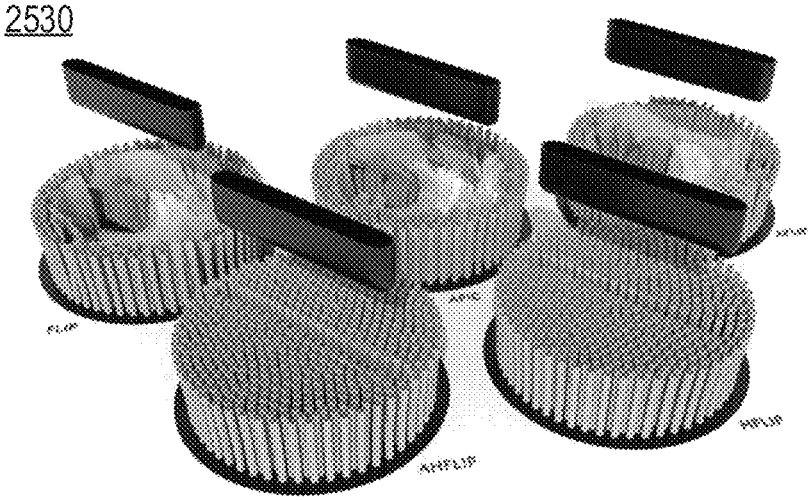

FIG. 25 shows results of simulating pressed brushes. A round-box is inserted into a brush with approximate 47 thousand (47K) strands (2510), rotated (2520), and then pulled out (2530). The averaged gap (≈0.015 cm) between the strands in a cluster may be much smaller than the averaged distance between strand vertices (0.25 cm), to which the cell size is required to be comparable to capture and resolve the contact between strands. Since the gap between strands may be subgrid-scale, the strands simulated with FLIP, APIC, or AFLIP fail to escape the positional trap and keep being entangled. On the other hand, the strands simulated with HFLIP or AHFLIP successfully recover to their rest shape due to the correct handling of particle position update.

Figure 26:
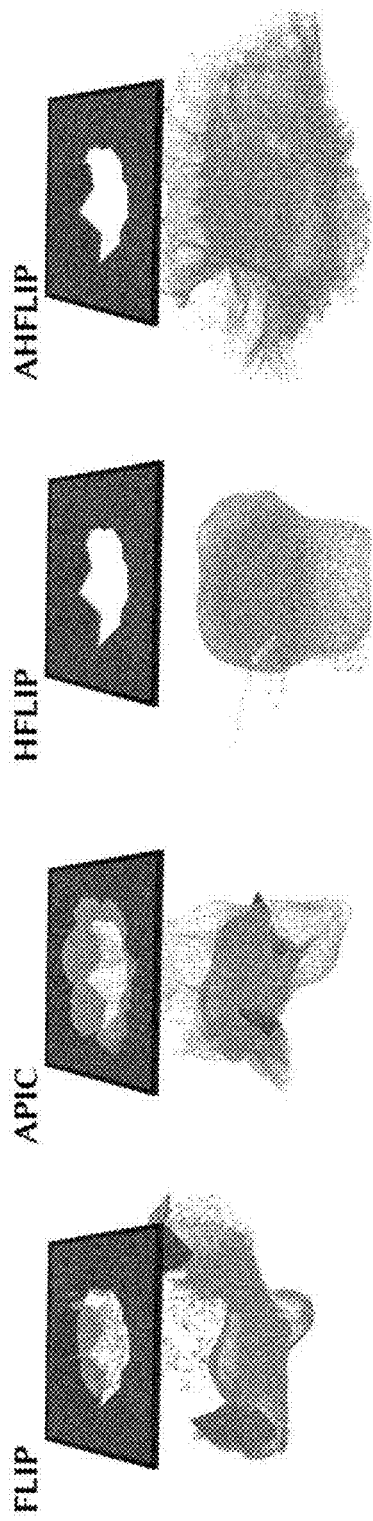
FIG. 26 shows results of various embodiments performing clay breaking through elastic board simulation.

FIG. 26 shows results of simulating clay breaks through elastic board. Clay particles fall onto a non-frictional elastic plate: consisting of a few pre-fractured meshes. In the simulations with FLIP and APIC, the disconnected meshes exhibit strong viscosity, and the clay particles stick to the plates due to excess dissipation. Instead, with HFLIP or AHFLIP, the clay particles quickly slide.

Figure 27:
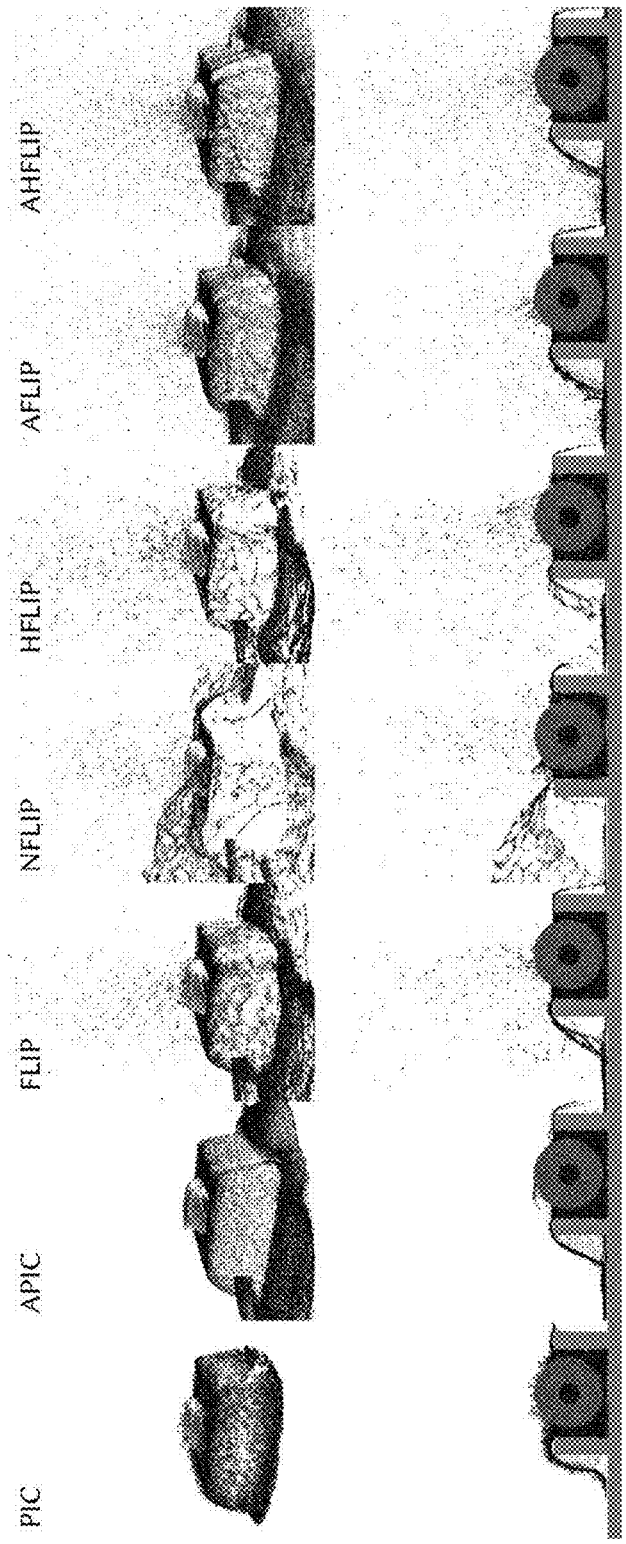
FIG. 27 shows results of various embodiments performing wheel rolling up grits simulation.

FIG. 27 shows results of simulating wheel rolls up grits. The top row shows perspective view; and the bottom row shows cutaway view. Simulations with PIC or APIC are significantly more viscous than the others. Without correctly resolving the boundary conditions, NFLIP drives particles to the left side instead of the upper side. With the affine velocity modes, AHFLIP and AFLIP manage to distribute particles without clumping artifact uniformly. Moreover, AHFLIP sprays more particles into the air.

Figure 28:
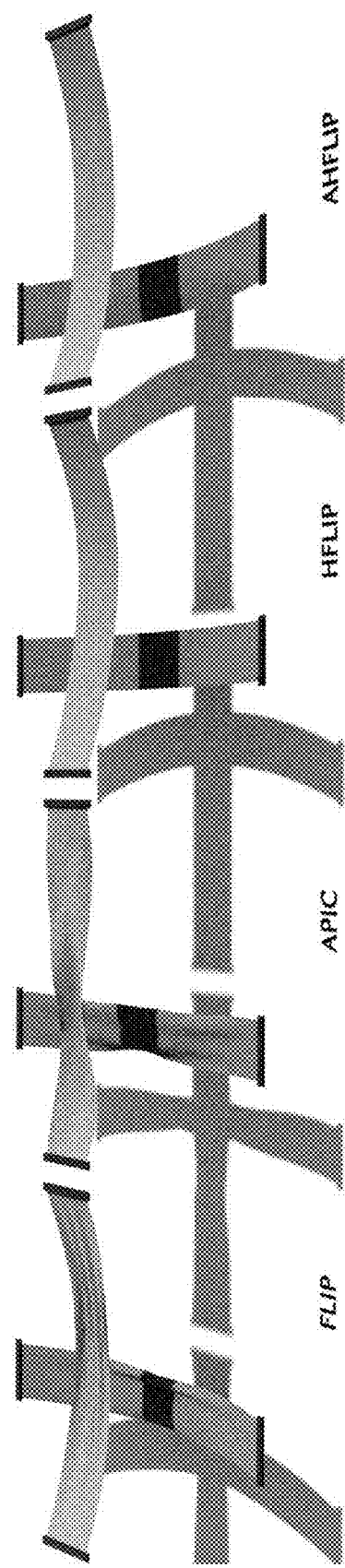
FIG. 28 shows results of various embodiments performing separating two pieces of sheets simulation.

FIG. 28 shows results of simulating separating two pieces of sheets. Two pieces of clothes stacked initially with a gap of less than half of the cell size are pulled apart. Simulations with FLIP and APIC manifest delayed separation due to numerical viscosity and produce resolution-dependent wrinkles. With the heuristic correction, neither of the issues exists anymore.

The present disclosure provide a method, an apparatus, and a non-transitory computer readable storage medium for a heuristic scheme in material point method for simulating materials. The present disclosure describes various embodiments to achieve easier particle separation and reduce the numerical dissipation in MPM. A heuristic FLIP (HFLIP) scheme, an affine-augmented FLIP (AFLIP) scheme, and an affine-augmented heuristic FLIP (AHFLIP) scheme may be used as integrators in a MPM, as a modified MPM. These various embodiments improve effectiveness of MPM, and thus, improve the technical field of computer generated imagery (CGI). The present disclosure provides at least one of the following contributions: the heuristic integration scheme in one or more embodiment manages to break the positional trap and applies to both FLIP and APIC to reduce the dissipation among separating particles; and/or the one or more embodiment generates more energetic dynamics with almost zero extra computational costs. The one or more embodiment may save computation power by reducing memory consumption and/or central processing unit/graphics processing unit (CPU/GPU) running time.

While the particular invention has been described with reference to illustrative embodiments, this description is not meant to be limiting. Various modifications of the illustrative embodiments and additional embodiments of the invention will be apparent to one of ordinary skill in the art from this description. Those skilled in the art will readily recognize that these and various other modifications can be made to the exemplary embodiments, illustrated and described herein, without departing from the spirit and scope of the present invention. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive

What is claimed is:

1. A method for simulating and rendering a material with a modified material point method, the method comprising:
for each of a plurality of time-steps of simulating a material:
transferring, by a device comprising a memory storing instructions and a processor in communication with the memory, states of particles representing the material at a N-th time-step to a grid, wherein N is an integer, the states of the particles comprise velocities of the particles and positions of the particles, and the grid comprises a plurality of grid-nodes,
determining, by the device, a plurality of grid-node velocities at the N-th time-step using a particle-to-grid computation based on the states of the particles at the N-th time-step,
updating, by the device, the plurality of grid-node velocities at a (N+1)-th time-step based on grid forces, and
updating, by the device, the states of the particles at the (N+1)-th time-step using a grid-to-particle computation based on the states of the particles at the N-th time-step, the plurality of grid-node velocities at the N-th time-step, and the plurality of grid-node velocities at the (N+1)-th time-step, wherein the grid-to-particle computation comprises a velocity grid-to-particle computation and a position grid-to-particle computation; and
rendering, by the device, one or more image depicting the material based on the states of the particles at the plurality of time-steps, wherein:
the velocity grid-to-particle computation comprises a velocity adjustment term;
the position grid-to-particle computation comprises a position adjustment term;
the velocity adjustment term comprises $\alpha(v_p^n - \Sigma_i w_{ip} v_i^n)$; and
the position adjustment term comprises $\beta_p \alpha(v_p^n - \Sigma_i w_{ip} v_i^n)$,
wherein:
α is a blending parameter comprising a value between 0 and 1, inclusive, $\beta_p$ is a trap-breaking parameter for a p-th particle, p being a non-negative integer, and the trap-breaking parameter comprising a value between 0 and 1, inclusive, $v_p^n$ is a velocity at the N-th time-step for a p-th particle, p being a non-negative integer, $v_i^n$ is a velocity at the N-th time-step for a i-th grid-node, i being a non-negative integer, and $w_{ip}$ is a weight parameter for the p-th particle and the i-th grid-node.

2. The method according to claim 1, wherein:

the updating the states of the particles at the (N+1)-th time-step using the grid-to-particle computation based on the states of the particles at the N-th time-step, the plurality of grid-node velocities at the N-th time-step, and the plurality of grid-node velocities at the (N+1)-th time-step comprises:

updating the velocities of the particles at the (N+1)-th time-step using the velocity grid-to-particle computation based on the velocities of the particles at the N-th time-step, the plurality of grid-node velocities at the N-th time-step, and the plurality of grid-node velocities at the (N+1)-th time-step, and updating the positions of the particles at the (N+1)-th time-step using the position grid-to-particle computation based on the states of the particles at the N-th time-step, the plurality of grid-node velocities at the N-th time-step, and the plurality of grid-node velocities at the (N+1)-th time-step.

3. The method according to claim 2, the method further comprising:

determining whether a first, a second, or a third heuristic scheme satisfies for a p-th particle based on states of the p-th particle at the N-th time-step, wherein:

the first heuristic scheme comprises that a particle is at or within a boundary and moves towards the boundary, the second heuristic scheme comprises that a particle is at or within a source, the third heuristic scheme comprises that a volume ratio for a particle is within a pre-determined volume ratio threshold; and in response to determining that the first heuristic scheme is satisfied for the p-th particle, setting $\beta_p$ as zero;

in response to determining that the second heuristic scheme is satisfied for the p-th particle, setting $\beta_p$ as zero;

in response to determining the third heuristic scheme is satisfied for the p-th particle, setting $\beta_p$ as a first pre-determined trap-breaking value, wherein the first pre-determined trap-breaking value is between 0 and 1, inclusive; and in response to determining none of the first, the second, and the third heuristic scheme is satisfied for the p-th particle, setting $\beta_p$ as a second pre-determined trap-breaking value, wherein the second pre-determined trap-breaking value is between 0 and 1, inclusive, wherein the second pre-determined trap-breaking value is larger than the first pre-determined trap-breaking value.

4. The method according to claim 1, wherein:

the particle-to-grid computation comprises a velocity gradient term;

the velocity grid-to-particle computation comprises a second velocity adjustment term; and the updating the states of the particles at the (N+1)-th time-step using the grid-to-particle computation based on the states of the particles at the N-th time-step, the plurality of grid-node velocities at the N-th time-step, and the plurality of grid-node velocities at the (N+1)-th time-step comprises:

updating the velocities of the particles at the (N+1)-th time-step using the velocity grid-to-particle computation based on the velocities of the particles at the N-th time-step, the plurality of grid-node velocities at the N-th time-step, and the plurality of grid-node velocities at the (N+1)-th time-step, updating the positions of the particles at the (N+1)-th time-step using the position grid-to-particle computation based on the states of the particles at the N-th time-step and the plurality of grid-node velocities at the (N+1)-th time-step, and updating a velocity gradient parameter at the (N+1)-th time-step using a velocity gradient computation based on the states of the particles at the N-th time-step and the plurality of grid-node velocities at the (N+1)-th time-step.

5. The method according to claim 4, wherein:

the velocity gradient term comprises $C_p^n(x_i^n - x_p^n)$;

the second velocity adjustment term comprises $\alpha(v_p^n - \Sigma_i w_{ip} v_i^n)$; and the velocity gradient computation comprises $C_p^{n+1} = \Sigma_i w_{ip} v_i^* (x_i^n - x_p^n)^T (D_p^n)^{-1}$, wherein:

$C_p^n$ and $C_p^{n+1}$ are the velocity gradient parameter at the N-th time-step and the (N+1)-th time-step for a p-th particle, respectively, p being a non-negative integer, $x_i^n$ is a position at the N-th time-step for a i-th grid-node, i being a non-negative integer, $x_p^n$ a position at the N-th time-step for the p-th particle, $\alpha$ is a blending parameter comprising a value between 0 and 1, inclusive, $v_p^n$ is a velocity at the N-th time-step for the p-th particle, $v_i^n$ is a velocity at the N-th time-step for the i-th grid-node, $v_i^*$ is a velocity at the (N+1)-th time-step for the i-th grid-node, $w_{ip}$ is a weight parameter for the p-th particle and the i-th grid-node, and $D_p^n$ is a B-spline quadratic kernel at the N-th time-step for the p-th particle.

6. The method according to claim 1, wherein:

the particle-to-grid computation comprises a velocity gradient term;

the velocity grid-to-particle computation comprises a second velocity adjustment term;

the position grid-to-particle computation comprises a second position adjustment term; and the updating the states of the particles at the (N+1)-th time-step using the grid-to-particle computation based on the states of the particles at the N-th time-step, the plurality of grid-node velocities at the N-th time-step, and the plurality of grid-node velocities at the (N+1)-th time-step comprises:

updating the velocities of the particles at the (N+1)-th time-step using the velocity grid-to-particle computation based on the velocities of the particles at the N-th time-step, the plurality of grid-node velocities at the N-th time-step, and the plurality of grid-node velocities at the (N+1)-th time-step, updating the positions of the particles at the (N+1)-th time-step using the position grid-to-particle computation based on the states of the particles at the N-th time-step, the plurality of grid-node velocities at the N-th time-step, and the plurality of grid-node velocities at the (N+1)-th time-step, and updating a velocity gradient parameter at the (N+1)-th time-step using a velocity gradient computation based on the states of the particles at the N-th time-step and the plurality of grid-node velocities at the (N+1)-th time-step.

7. An apparatus for simulating and rendering a material with a modified material point method, the apparatus comprising:
a memory storing instructions; and
a processor in communication with the memory, wherein, when the processor executes the instructions, the processor is configured to cause the apparatus to:
for each of a plurality of time-steps of simulating a material:
transfer states of particles representing the material at a N-th time-step to a grid, wherein N is an integer, the states of the particles comprise velocities of the particles and positions of the particles, and the grid comprises a plurality of grid-nodes,
determine a plurality of grid-node velocities at the N-th time-step using a particle-to-grid computation based on the states of the particles at the N-th time-step,
update the plurality of grid-node velocities at a (N+1)-th time-step based on grid forces, and
update the states of the particles at the (N+1)-th time-step using a grid-to-particle computation based on the states of the particles at the N-th time-step, the plurality of grid-node velocities at the N-th time-step, and the plurality of grid-node velocities at the (N+1)-th time-step, wherein the grid-to-particle computation comprises a velocity grid-to-particle computation and a position grid-to-particle computation, and
render one or more image depicting the material based on the states of the particles at the plurality of time-steps,
wherein:
the velocity grid-to-particle computation comprises a velocity adjustment term;
the position grid-to-particle computation comprises a position adjustment term;
the velocity adjustment term comprises $\alpha(v_p^n - \Sigma_i w_{ip} v_i^n)$; and
the position adjustment term comprises $\beta_p \alpha(v_p^n - \Sigma_i w_{ip} v_i^n)$,
wherein:
$\alpha$ is a blending parameter comprising a value between 0 and 1, inclusive,
$\beta_p$ is a trap-breaking parameter for a p-th particle, p being a non-negative integer, and the trap-breaking parameter comprising a value between 0 and 1, inclusive,
$v_p^n$ is a velocity at the N-th time-step for a p-th particle, p being a non-negative integer,
$v_i^n$ is a velocity at the N-th time-step for a i-th grid-node, i being a non-negative integer, and
$w_{ip}$ is a weight parameter for the p-th particle and the i-th grid-node.

8. The apparatus according to claim 7, wherein:
when the processor is configured to cause the apparatus to update the states of the particles at the (N+1)-th time-step using the grid-to-particle computation based on the states of the particles at the N-th time-step, the plurality of grid-node velocities at the N-th time-step, and the plurality of grid-node velocities at the (N+1)-th time-step, the processor is configured to cause the apparatus to:
update the velocities of the particles at the (N+1)-th time-step using the velocity grid-to-particle computation based on the velocities of the particles at the N-th time-step, the plurality of grid-node velocities at the N-th time-step, and the plurality of grid-node velocities at the (N+1)-th time-step, and
update the positions of the particles at the (N+1)-th time-step using the position grid-to-particle computation based on the states of the particles at the N-th time-step, the plurality of grid-node velocities at the N-th time-step, and the plurality of grid-node velocities at the (N+1)-th time-step.

9. The apparatus according to claim 8, wherein, when the processor executes the instructions, the processor is configured to further cause the apparatus to:
determine whether a first, a second, or a third heuristic scheme satisfies for a p-th particle based on states of the p-th particle at the N-th time-step, wherein:
the first heuristic scheme comprises that a particle is at or within a boundary and moves towards the boundary,
the second heuristic scheme comprises that a particle is at or within a source,
the third heuristic scheme comprises that a volume ratio for a particle is within a pre-determined volume ratio threshold; and
in response to determining that the first heuristic scheme is satisfied for the p-th particle, set $\beta_p$ as zero;
in response to determining that the second heuristic scheme is satisfied for the p-th particle, set $\beta_p$ as zero;
in response to determining the third heuristic scheme is satisfied for the p-th particle, set $\beta_p$ as a first pre-determined trap-breaking value, wherein the first pre-determined trap-breaking value is between 0 and 1, inclusive; and
in response to determining none of the first, the second, and the third heuristic scheme is satisfied for the p-th particle, set $\beta_p$ as a second pre-determined trap-breaking value, wherein the second pre-determined trap-breaking value is between 0 and 1, inclusive,
wherein the second pre-determined trap-breaking value is larger than the first pre-determined trap-breaking value.

10. The apparatus according to claim 7, wherein:
the particle-to-grid computation comprises a velocity gradient term;
the velocity grid-to-particle computation comprises a second velocity adjustment term; and
when the processor is configured to cause the apparatus to update the states of the particles at the (N+1)-th time-step using the grid-to-particle computation based on the states of the particles at the N-th time-step, the plurality of grid-node velocities at the N-th time-step, and the plurality of grid-node velocities at the (N+1)-th time-step, the processor is configured to cause the apparatus to:
update the velocities of the particles at the (N+1)-th time-step using the velocity grid-to-particle computation based on the velocities of the particles at the N-th time-step, the plurality of grid-node velocities at the N-th time-step, and the plurality of grid-node velocities at the (N+1)-th time-step,
update the positions of the particles at the (N+1)-th time-step using the position grid-to-particle computation based on the states of the particles at the N-th time-step and the plurality of grid-node velocities at the (N+1)-th time-step, and update a velocity gradient parameter at the (N+1)-th time-step using a velocity gradient computation based on the states of the particles at the N-th time-step and the plurality of grid-node velocities at the (N+1)-th time-step.

11. The apparatus according to claim 10, wherein:

the velocity gradient term comprises $C_p{}^n(x_i{}^n-x_p{}^n)$;

the second velocity adjustment term comprises $\alpha(v_p{}^n - \Sigma_i w_{ip} v_i{}^n)$; and the velocity gradient computation comprises $C_p{}^{n+1} = \Sigma_i w_{ip} v_i^* (x_i{}^n - x_p{}^n)^T (D_p{}^n)^{-1}$, wherein:

$C_p{}^n$ and $C_p{}^{n+1}$ are the velocity gradient parameter at the N-th time-step and the (N+1)-th time-step for a p-th particle, respectively, p being a non-negative integer, $x_i{}^n$ is a position at the N-th time-step for a i-th grid-node, i being a non-negative integer, $x_p{}^n$ is a position at the N-th time-step for the p-th particle, α is a blending parameter comprising a value between 0 and 1, inclusive, $v_p{}^n$ is a velocity at the N-th time-step for the p-th particle, $v_i{}^n$ is a velocity at the N-th time-step for the i-th grid-node, $v_i^*$ is a velocity at the (N+1)-th time-step for the i-th grid-node, $w_{ip}$ is a weight parameter for the p-th particle and the i-th grid-node, and $D_p{}^n$ is a B-spline quadratic kernel at the N-th time-step for the p-th particle.

12. The apparatus according to claim 7, wherein:

the particle-to-grid computation comprises a velocity gradient term;

the velocity grid-to-particle computation comprises a second velocity adjustment term;

the position grid-to-particle computation comprises a second position adjustment term; and when the processor is configured to cause the apparatus to update the states of the particles at the (N+1)-th time-step using the grid-to-particle computation based on the states of the particles at the N-th time-step, the plurality of grid-node velocities at the N-th time-step, and the plurality of grid-node velocities at the (N+1)-th time-step, the processor is configured to cause the apparatus to:

update the velocities of the particles at the (N+1)-th time-step using the velocity grid-to-particle computation based on the velocities of the particles at the N-th time-step, the plurality of grid-node velocities at the N-th time-step, and the plurality of grid-node velocities at the (N+1)-th time-step, update the positions of the particles at the (N+1)-th time-step using the position grid-to-particle computation based on the states of the particles at the N-th time-step, the plurality of grid-node velocities at the N-th time-step, and the plurality of grid-node velocities at the (N+1)-th time-step, and update a velocity gradient parameter at the (N+1)-th time-step using a velocity gradient computation based on the states of the particles at the N-th time-step and the plurality of grid-node velocities at the (N+1)-th time-step.

13. A non-transitory computer readable storage medium storing instructions, wherein, when the instructions are executed by a processor, the instructions are configured to cause the processor to:

for each of a plurality of time-steps of simulating a material:

transfer states of particles representing the material at a N-th time-step to a grid, wherein N is an integer, the states of the particles comprise velocities of the particles and positions of the particles, and the grid comprises a plurality of grid-nodes, determine a plurality of grid-node velocities at the N-th time-step using a particle-to-grid computation based on the states of the particles at the N-th time-step, update the plurality of grid-node velocities at a (N+1)-th time-step based on grid forces, and update the states of the particles at the (N+1)-th time-step using a grid-to-particle computation based on the states of the particles at the N-th time-step, the plurality of grid-node velocities at the N-th time-step, and the plurality of grid-node velocities at the (N+1)-th time-step, wherein the grid-to-particle computation comprises a velocity grid-to-particle computation and a position grid-to-particle computation; and render one or more image depicting the material based on the states of the particles at the plurality of time-steps, wherein:

the velocity grid-to-particle computation comprises a velocity adjustment term;

the position grid-to-particle computation comprises a position adjustment term;

the velocity adjustment term comprises $\alpha(v_p{}^n - \Sigma_i w_{ip} v_i{}^n)$; and the position adjustment term comprises $\beta_p \alpha(v_p{}^n - \Sigma_i w_{ip} v_i{}^n)$, wherein:

α is a blending parameter comprising a value between 0 and 1, inclusive, $\beta_p$ is a trap-breaking parameter for a p-th particle, p being a non-negative integer, and the trap-breaking parameter comprising a value between 0 and 1, inclusive, $v_p{}^n$ is a velocity at the N-th time-step for a p-th particle, p being a non-negative integer, $v_i{}^n$ is a velocity at the N-th time-step for a i-th grid-node, i being a non-negative integer, and $w_{ip}$ is a weight parameter for the p-th particle and the i-th grid-node.

14. The non-transitory computer readable storage medium according to claim 13, wherein:

when the instructions are configured to cause the processor to update the states of the particles at the (N+1)-th time-step using the grid-to-particle computation based on the states of the particles at the N-th time-step, the plurality of grid-node velocities at the N-th time-step, and the plurality of grid-node velocities at the (N+1)-th time-step, the instructions are configured to cause the processor to:

update the velocities of the particles at the (N+1)-th time-step using the velocity grid-to-particle computation based on the velocities of the particles at the N-th time-step, the plurality of grid-node velocities at the N-th time-step, and the plurality of grid-node velocities at the (N+1)-th time-step, and update the positions of the particles at the (N+1)-th time-step using the position grid-to-particle computation based on the states of the particles at the N-th time-step, the plurality of grid-node velocities at the N-th time-step, and the plurality of grid-node velocities at the (N+1)-th time-step.

15. The non-transitory computer readable storage medium according to claim 14, wherein, when the instructions are executes by the processor, the instructions are configured to further cause the processor to:
determine whether a first, a second, or a third heuristic scheme satisfies for a p-th particle based on states of the p-th particle at the N-th time-step, wherein:
the first heuristic scheme comprises that a particle is at or within a boundary and moves towards the boundary,
the second heuristic scheme comprises that a particle is at or within a source,
the third heuristic scheme comprises that a volume ratio for a particle is within a pre-determined volume ratio threshold; and
in response to determining that the first heuristic scheme is satisfied for the p-th particle, set $\beta_p$ as zero;
in response to determining that the second heuristic scheme is satisfied for the p-th particle, set $\beta_p$ as zero;
in response to determining the third heuristic scheme is satisfied for the p-th particle, set $\beta_p$ as a first pre-determined trap-breaking value, wherein the first pre-determined trap-breaking value is between 0 and 1, inclusive; and
in response to determining none of the first, the second, and the third heuristic scheme is satisfied for the p-th particle, set $\beta_p$ as a second pre-determined trap-breaking value, wherein the second pre-determined trap-breaking value is between 0 and 1, inclusive,
wherein the second pre-determined trap-breaking value is larger than the first pre-determined trap-breaking value.

16. The non-transitory computer readable storage medium according to claim 13, wherein:
the particle-to-grid computation comprises a velocity gradient term;
the velocity grid-to-particle computation comprises a second velocity adjustment term; and
when the instructions are configured to cause the processor to update the states of the particles at the (N+1)-th time-step using the grid-to-particle computation based on the states of the particles at the N-th time-step, the plurality of grid-node velocities at the N-th time-step, and the plurality of grid-node velocities at the (N+1)-th time-step, the instructions are configured to cause the processor to:
update the velocities of the particles at the (N+1)-th time-step using the velocity grid-to-particle computation based on the velocities of the particles at the N-th time-step, the plurality of grid-node velocities at the N-th time-step, and the plurality of grid-node velocities at the (N+1)-th time-step,
update the positions of the particles at the (N+1)-th time-step using the position grid-to-particle computation based on the states of the particles at the N-th time-step and the plurality of grid-node velocities at the (N+1)-th time-step, and
update a velocity gradient parameter at the (N+1)-th time-step using a velocity gradient computation based on the states of the particles at the N-th time-step and the plurality of grid-node velocities at the (N+1)-th time-step.

17. The non-transitory computer readable storage medium according to claim 16, wherein:
the velocity gradient term comprises $C_p^n(x_i^n - x_p^n)$;
the second velocity adjustment term comprises $\alpha(v_p^n - \Sigma_i w_{ip} v_i^n)$; and
the velocity gradient computation comprises $C_p^{n+1} = \Sigma_i w_{ip} v_i^*(x_i^n - x_p^n)^T (D_p^n)^{-1}$,
wherein:
$C_p^n$ and $C_p^{n+1}$ are the velocity gradient parameter at the N-th time-step and the (N+1)-th time-step for a p-th particle, respectively, p being a non-negative integer,
$x_i^n$ is a position at the N-th time-step for a i-th grid-node, i being a non-negative integer,
$x_p^n$ a position at the N-th time-step for the p-th particle,
$\alpha$ is a blending parameter comprising a value between 0 and 1, inclusive,
$v_p^n$ is a velocity at the N-th time-step for the p-th particle,
$v_i^n$ is a velocity at the N-th time-step for the i-th grid-node,
$v_i^*$ is a velocity at the (N+1)-th time-step for the i-th grid-node,
$w_{ip}$ is a weight parameter for the p-th particle and the i-th grid-node, and
$D_p^n$ is a B-spline quadratic kernel at the N-th time-step for the p-th particle.

* * * * *